United States Patent
Lim et al.

(10) Patent No.: US 11,663,445 B2
(45) Date of Patent: May 30, 2023

(54) SERVER COMMUNICATING WITH DISHWASHER

(71) Applicant: LG ELECTRONICS INC., Seoul (KR)

(72) Inventors: Seongju Lim, Seoul (KR); Changseok Ock, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 827 days.

(21) Appl. No.: 16/604,105

(22) PCT Filed: Feb. 1, 2019

(86) PCT No.: PCT/KR2019/001454
§ 371 (c)(1),
(2) Date: Oct. 9, 2019

(87) PCT Pub. No.: WO2019/139461
PCT Pub. Date: Jul. 18, 2019

(65) Prior Publication Data
US 2020/0034688 A1   Jan. 30, 2020

(51) Int. Cl.
*G06N 3/04* (2023.01)
*A47L 15/00* (2006.01)
(Continued)

(52) U.S. Cl.
CPC ............ *G06N 3/04* (2013.01); *A47L 15/0049* (2013.01); *A47L 15/0063* (2013.01); *G06N 3/08* (2013.01); *H04L 12/2823* (2013.01); *H04L 67/12* (2013.01)

(58) Field of Classification Search
CPC . G06N 3/04; G06N 3/08; H04K 67/12; A47L 15/0049; A47L 15/0063
See application file for complete search history.

(56) References Cited

U.S. PATENT DOCUMENTS 10,242,665 B1 * 3/2019 Abeloe ................. G06N 5/046
11,212,388 B2 * 12/2021 Kim ...................... H04L 12/282
(Continued)

FOREIGN PATENT DOCUMENTS

| CN | 10-8111360 | 6/2018 |
| CN | 10-8852239 | 11/2018 |

(Continued)

OTHER PUBLICATIONS

PCT International Application No. PCT/KR2019/001454, Written Opinion of the International Searching Authority dated Oct. 25, 2019, 12 pages.

(Continued)

*Primary Examiner* — Muthuswamy G Manoharan
(74) *Attorney, Agent, or Firm* — Lee, Hong, Degerman, Kang & Waimey PC

(57) ABSTRACT

A server communicating with a dishwasher is disclosed. The server communicating with a dishwasher, according to an embodiment of the present invention, comprises: a communication unit for communicating with one or more dishwashers; a memory for storing learning results obtained using a plurality of failure causes and operation information corresponding to each of the plurality of failure causes; and a processor for receiving operation information of a particular dishwasher among the one or more dishwashers from the particular dishwasher, and acquiring the cause of a failure occurring in the particular dishwasher by using the operation information of the particular dishwasher and the learning results, wherein the learning results include relational parameters corresponding to the relationships between the plurality of failure causes and the operation information.

18 Claims, 14 Drawing Sheets

(51) Int. Cl.
*G06N 3/08* (2023.01)
*H04L 12/28* (2006.01)
*H04L 67/12* (2022.01)

(56) References Cited

U.S. PATENT DOCUMENTS

| | | |
|---|---|---|
| 2006/0259163 A1 | 11/2006 | Hsiung et al. |
| 2013/0238283 A1 | 9/2013 | Kwon et al. |
| 2019/0014968 A1 | 1/2019 | Padtberg et al. |
| 2020/0003659 A1* | 1/2020 | Davies ............... G01R 19/2513 |

FOREIGN PATENT DOCUMENTS

| | | |
|---|---|---|
| KR | 1020130105600 | 9/2013 |
| KR | 1020160006832 | 1/2016 |
| KR | 101750760 | 7/2017 |
| KR | 101860015 | 5/2018 |

OTHER PUBLICATIONS

European Patent Office Application Serial No. 19739145.1, Search Report dated Jul. 18, 2022, 9 pages.

\* cited by examiner

SERVER COMMUNICATING WITH DISHWASHER

CROSS-REFERENCE TO RELATED APPLICATIONS

This application is the National Stage filing under 35 U.S.C. 371 of International Application No. PCT/KR2019/001454, filed on Feb. 1, 2019, the contents of which are hereby incorporated by reference herein its entirety.

TECHNICAL FIELD

The present disclosure relates to a server communicating with a dishwasher, which is capable of determining the cause of defect occurrence in the dishwasher.

BACKGROUND ART

Artificial intelligence is one field of computer engineering and information technology for studying a method of enabling a computer to perform thinking, learning, and self-development that can be performed by human intelligence and may denote that a computer imitates an intelligent action of a human.

Moreover, artificial intelligence is directly or indirectly associated with the other field of computer engineering without being individually provided. Particularly, at present, in various fields of information technology, an attempt to introduce artificial intelligence components and use the artificial intelligence components in solving a problem of a corresponding field is being actively done.

Meanwhile, techniques for perceiving and learning the surrounding situation by using artificial intelligence and providing information desired by the user in a desired form, or performing an operation or function desired by the user are being actively studied.

A dishwasher is a device that cleans dishes by separating contaminants on the surfaces of the dishes from the dishes by using high-pressure washing water sprayed from spray nozzles.

The dishwasher performs various complicated operations such as water supply, spraying, heating, draining, and drying cycles. Therefore, the dishwasher has a disadvantage that defects frequently occur.

Korean Patent Application Publication No. 10-2006-0034108 discloses a method for detecting defects of specific parts of a dishwasher.

Meanwhile, various types of defects may occur in the dishwasher, and when a defect occurs, a customer detects the defect and requests repair from a service center.

However, it takes a long time until the customer detects the defect, and after the customer detects the defect, it takes a long time until a repair worker is dispatched from a service center and an actual repair process is performed. Accordingly, the customer has to wait a long time until the dishwasher operates normally.

In addition, it is important to accurately determine the cause of defect occurrence so as to repair the dishwasher. However, the customer may only explain symptoms such as water supply disorder, drainage disorder, dryness disorder, etc., and it is difficult to explain specifically what causes the defect.

Therefore, the repairer must operate the dishwasher directly on the spot without any prior information or must disassemble the dishwasher so as to determine the cause of defects. In this case, an untrained repairer may have difficulty in identifying the cause of defects or repairing the dishwasher according to the cause of defects. When the necessary component is not provided, the repairer must revisit with the necessary component.

In addition, the defects in the dishwasher are often caused by incorrect use of the customer, not by malfunction. However, even in such a case, it is difficult to grasp the defect caused by the wrong use of the customer, so that the consultation time with the customer may be prolonged or the repairer may have to visit the customer directly.

DISCLOSURE OF THE INVENTION

Technical Problem

The present disclosure has been made in an effort to solve the above-described problems, and an object of the present disclosure is to grasp various causes of defect occurrence by using information collected in a dishwasher.

An object of the present disclosure is also to grasp the cause of defect occurrence in advance and reduce the time required until the repair is performed.

An object of the present disclosure is also to provide guidance in the event that a defect is caused by misuse of a customer.

Technical Solution

A server communicating with a dishwasher according to an embodiment of the present disclosure trains a neural network by using a cause of defect occurrence and operation information corresponding to the cause of defect occurrence and inputs the operation information of the specific dishwasher to the trained neural network to acquire the cause of defect occurrence.

The server communicating with the dishwasher according to the embodiment of the present disclosure transmits the cause of defect occurrence to a user side device of the dishwasher or a service provider server.

When the defect caused by the user's erroneous operation occurs, the server communicating with the dishwasher according to the embodiment of the present disclosure transmits a usage method corresponding to the erroneous operation to the user side device of the dishwasher.

Advantageous Effects

According to the present disclosure, by training the neural network using motion information collected from various defective states, there is an advantage in that it is possible to grasp various cause of defects that may occur in the dishwasher even if the device or algorithm for determining defects is not separately provided according to the type of defect.

According to the present disclosure, the occurrence of defects and the cause of defect occurrence may be grasped in advance and provided to customers. Therefore, customers may quickly become aware of the occurrence of defects and may quickly request service from a service provider. Also, customers may get fast and accurate service by informing the service company about the cause of defect occurrence.

Further, according to the present disclosure, it is possible to grasp the occurrence of defects and the cause of defect occurrence in advance and provide them to the service center. Therefore, the service center may prepare a repair service by grasping the occurrence of defect in advance, and even if it is possible to quickly and accurately recognize the cause of defect occurrence without visiting the site, and know a repair method in advance, or prepare the necessary parts in advance.

Further, according to the present disclosure, since it is determined that the defect is caused by the misuse of the user, the user is informed of the correct usage method, thereby saving cost and time and extending the service life of the product.

BEST MODE

Figure 1:
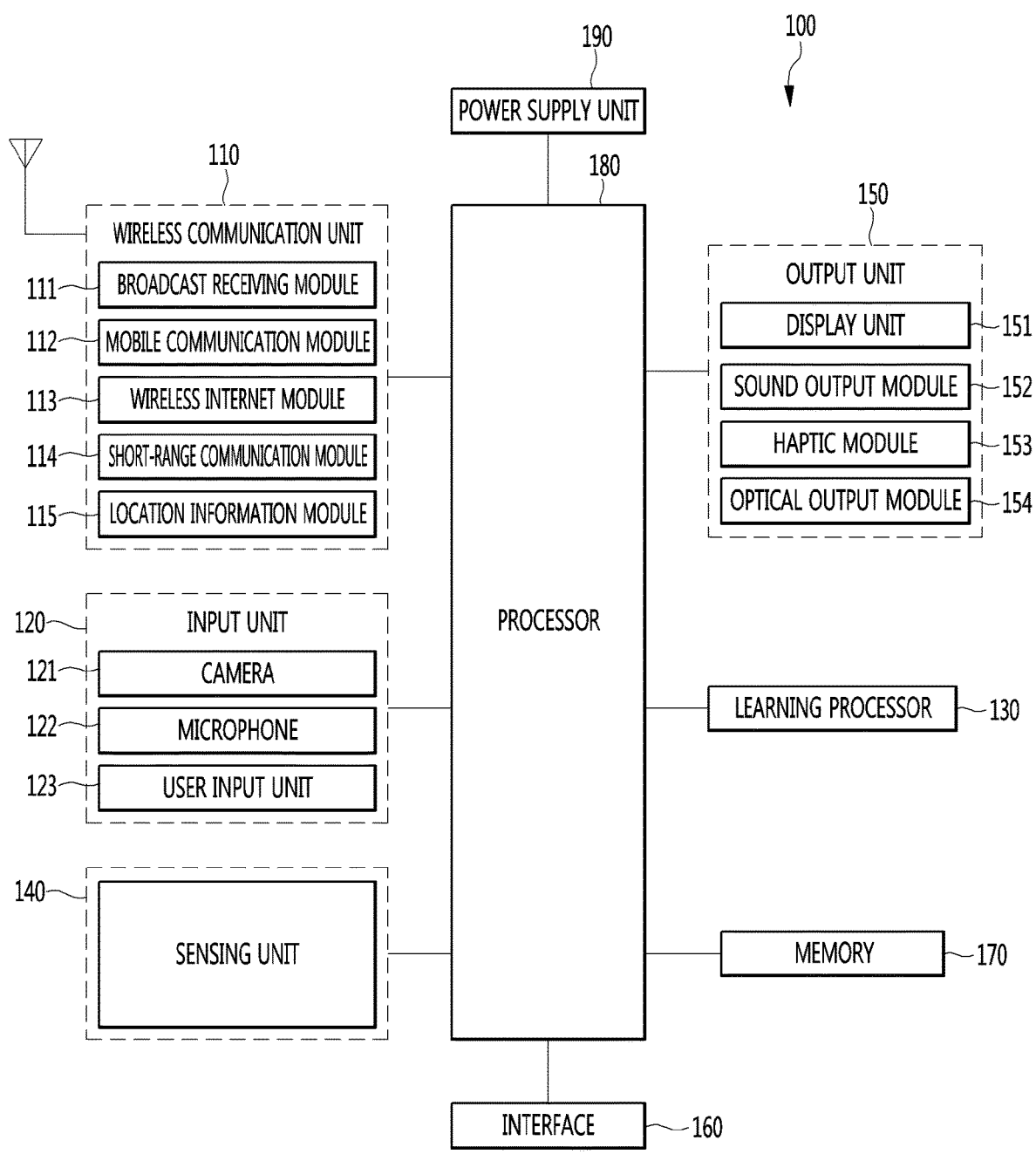
FIG. 1 is a block diagram for describing a server related to the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

A singular representation may include a plural representation unless it represents a definitely different meaning from the context. In the present application, the terms "comprise" or "include" and the like are intended to specify the presence of stated features, numbers, steps, operations, elements, parts, or combinations thereof, but do not preclude the presence or addition of one or more other features, numbers, steps, operations, elements, parts, or combinations thereof.

In implementing the present disclosure, components may be subdivided and described for convenience of explanation, but these components may be implemented in one device or module, or one element may be implemented by being divided into a plurality of devices or modules.

FIG. 1 is a block diagram for describing a server related to the present disclosure.

Referring to FIG. 1, the server 100 may include a wireless communication unit 110, an input unit 120, a learning processor 130, a sensing unit 140, an output unit 150, an interface unit 160, a memory 170, a processor 180, and a power supply unit 190.

The wireless communication unit 110 may include at least one of a broadcast receiving module 111, a mobile communication module 112, a wireless Internet module 113, a short-range communication module 114, or a location information module 115.

The broadcast receiving module 111 of the wireless communication unit 110 may receive a broadcast signal and/or broadcast related information from an external broadcast management server through a broadcast channel.

The mobile communication module 112 may transmit/receive a wireless signal to/from at least one of a base station, an external server, or a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless Internet module 113 refers to a module for wireless internet access and may be built in or external to the mobile server 100. The wireless Internet module 113 may be configured to transmit/receive a wireless signal in a communication network according to wireless internet technologies.

The wireless internet technology may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless internet module 113 transmits/receives data according at least one wireless internet technology including internet technology not listed above.

The short-range communication module 114 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, or Wireless Universal Serial Bus (USB) technologies.

The location information module 115 is a module for obtaining the location (or the current location) of a mobile server and its representative examples include a global positioning system (GPS) module or a Wi-Fi module. For example, the mobile server may obtain its position by using a signal transmitted from a GPS satellite through the GPS module.

The input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information inputted from a user and the mobile server 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the mobile server 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the mobile server 100 to correspond to the inputted information.

The user input unit 123 may include a mechanical input means (or a mechanical key, for example, a button, a dome switch, a jog wheel, and a jog switch at the front, back or side of the mobile server 100) and a touch type input means. As one example, a touch type input means may include a virtual key, a soft key, or a visual key, which is displayed on a touch screen through software processing or may include a touch key disposed at a portion other than the touch screen.

The learning processor 130 may be configured to receive, classify, store, and output information which is to be used for data mining, data analysis, intelligent decision, and machine learning algorithms.

The learning processor 130 may include one or more memory units which are configured to store data received, detected, sensed, generated, pre-defined, or outputted by another component, another device, another server, or an apparatus communicating with the server.

The learning processor 130 may include a memory which is integrated into or implemented in a server. In some embodiments, the learning processor 130 may be implemented with the memory 170.

Optionally or additionally, the learning processor 130 may be implemented with a memory associated with a server like an external memory directly coupled to the server or a memory which is maintained in a server communicating with the server.

In another embodiment, the learning processor 130 may be implemented with a memory maintained in a cloud computing environment or another remote memory position accessible by a server through a communication manner such as a network.

The learning processor 130 may be configured to store, in on or more databases, data for identifying, indexing, categorizing, manipulating, storing, retrieving, and outputting data for use in supervised or unsupervised learning, data mining, predictive analysis, or other machines.

Information stored in the learning processor 130 may be used by the processor 180 or one or more other controllers of a server by using at least one of various different types of data analysis algorithm or machine learning algorithm.

Examples of such algorithms may include a k-nearest neighbor system, a purge logic (for example, possibility theory), a neural network, Boltzmann machine, vector quantization, a pulse neural network, a support vector machine, a maximum margin classifier, hill climbing, an induction logic system Bayesian network, perrytnet (for example, a finite state machine, a milli machine, and a moor finite state machine), a classifier tree (for example, a perceptron tree, a support vector tree, a Markov tree, a decision tree forest, and an arbitrary forest), a reading model and system, artificial mergence, sensor mergence, image mergence, reinforcement mergence, augment reality, pattern recognition, and automated plan.

The processor 180 may determine or predict at least one executable operation of a server, based on information determined or generated by using a data analysis algorithm and a machine learning algorithm. To this end, the processor 180 may request, search for, receive, or use data of the learning processor 130 and may control the server to execute a predicted operation or a preferably determined operation of the at least one executable operation.

The processor 180 may perform various functions of implementing an intelligent emulation (i.e., a knowledge-based system, an inference system, and a knowledge acquisition system). The processor 180 may be applied to various types of systems (for example, a purge logic system) including an adaptive system, a machine learning system, and an ANN.

The processor 180 may include a sub-module enabling an arithmetic operation of processing a voice and a natural language voice, like an input/output (I/O) processing module, an environment condition processing module, a speechto-text (STT) processing module, a natural language processing module, a work flow processing module, and a service processing module.

Each of such sub-modules may access one or more systems or data and models or a subset or superset thereof in a server. Also, each of the sub-modules may provide various functions in addition to vocabulary index, user data, a work flow model, a service model, and an automatic speech recognition (ASR) system.

In another embodiment, another aspect of the processor 180 or a server may be implemented with the sub-module, system, or data and model.

In some embodiments, based on data of the learning processor 130, the processor 180 may be configured to detect and sense a requirement on the basis of an intention of a user or a context condition expressed as a user input or a natural language input.

The processor 180 may actively derive and obtain information which is needed in completely determining the requirement on the basis of the intention of the user or the context condition. For example, the processor 180 may analyze past data including an input log, an output log, pattern matching, unambiguous words, and an input intention, thereby actively deriving needed for determining the requirement.

The processor 180 may determine task flow for executing a function of responding to the requirement, based on the intention of the user or the context condition.

The processor 180 may be configured to collect, sense, extract, detect, and/or receive a signal or data used for data analysis and a machine learning operation through one or more sensing components in a server, for collecting information which is to be processed and stored in the learning processor 130.

Collecting of information may include an operation of sensing information through a sensor, an operation of extracting information stored in the memory 170, or an operation of receiving information through a communication means from another server, an entity, or an external storage device.

The processor 180 may collect usage history information from the server and may store the collected usage history information in the memory 170.

The processor 180 may determine an optimal match for executing a specific function by using the stored usage history information and prediction modeling.

The processor 180 may receive or sense ambient environmental information or other information through the sensing unit 140.

The processor 180 may receive a broadcast signal and/or broadcast-related information, a wireless signal, and wireless data through the wireless communication unit 110.

The processor 180 may receive image information (or a corresponding signal), audio information (or a corresponding signal), data, or user input information through the input unit 120.

The processor 180 may collect information in real time and may process or classify the collected information (for example, a knowledge graph, an instruction policy, an individualization database, a dialogue engine, etc.) and may store the processed information in the memory 170 or the learning processor 130.

When an operation of the server is determined based on the data analysis algorithm, the machine learning algorithm, and technique, the processor 180 may control elements of the server for executing the determined operation. Also, the processor 180 may control the server according to a control instruction to perform the determined operation.

When a specific operation is performed, the processor 180 may analyze history information representing execution of the specific operation through the data analysis algorithm, the machine learning algorithm, and technique and may update previously learned information, based on the analyzed information.

Therefore, the processor 180 may enhance an accuracy of a future performance of each of the data analysis algorithm, the machine learning algorithm, and the technique along with the learning processor 130, based on the updated information.

The sensing unit 140 may include at least one sensor for sensing at least one of information in a mobile server, environmental information around a mobile server, or user information.

For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 121), a microphone (for example, the microphone 122), a battery gauge, an environmental sensor (for example, a barometer, a hygrometer, a thermometer, a radiation sensor, a thermal sensor, and a gas sensor), or a chemical sensor (for example, an electronic nose, a healthcare sensor, and a biometric sensor). Moreover, a mobile server disclosed in this specification may combines information sensed by at least two or more sensors among such sensors and may then utilize it.

The output unit 150 is used to generate a visual, auditory, or haptic output and may include at least one of a display unit 151, a sound output module 152, a haptic module 153, or an optical output module 154.

The display unit 151 may display (output) information processed in the mobile server 100. For example, the display unit 151 may display execution screen information of an application program running on the mobile server 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the mobile server 100 and a user, and an output interface between the mobile server 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the mobile server 100. An example of an event occurring in the mobile server 100 includes message reception, call signal reception, missed calls, alarm, schedule notification, e-mail reception, and information reception through an application.

The interface unit 160 may serve as a path to various kinds of external devices connected to the mobile server 100. The interface unit 160 may include at least one of a wired/wireless headset port, an external charger port, a wired/wireless data port, a memory card port, a port connecting a device equipped with an identification module, an audio Input/Output (I/O) port, an image IO port, and or an earphone port. In correspondence to that an external device is connected to the interface unit 160, the mobile server 100 may perform an appropriate control relating to the connected external device.

Moreover, the identification module, as a chip storing various information for authenticating usage authority of the mobile server 100, may include a user identity module (UIM), a subscriber identity module (SIM), and a universal subscriber identity module (USIM). A device equipped with an identification module (hereinafter referred to as an identification device) may be manufactured in a smart card form. Accordingly, the identification device may be connected to the server 100 through the interface unit 160.

The memory 170 may store data for supporting various functions of the server 100.

The memory 170 may store a plurality of application programs or applications executed in the server 100, pieces of data and instructions for an operation of the server 100, and pieces of data (for example, at least one piece of algorithm information for machine learning) for an operation of the learning processor 130.

The processor 180 may control overall operations of the mobile server 100 generally besides an operation relating to the application program. The processor 180 may provide appropriate information or functions to a user or process them by processing signals, data, and information inputted/outputted through the above components or executing application programs stored in the memory 170.

Additionally, in order to execute an application program stored in the memory 170, the processor 180 may control at least part of the components shown in FIG. 1. Furthermore, in order to execute the application program, the processor 180 may combine at least two of the components in the mobile server 100 and may then operate it.

As described above, the processor 180 may control an operation associated with an application program and an overall operation of the server 100. For example, when a state of the server 100 satisfies a predetermined condition, the processor 180 may execute or release a lock state which limits an input of a control command of a user for applications.

The power supply unit 190 may receive external power or internal power under a control of the processor 180 and may then supply power to each component in the mobile server 100. The power supply unit 190 includes a battery and the battery may be a built-in battery or a replaceable battery.

Meanwhile, as described above, the processor 180 controls the operation associated with the application program and the overall operation of the server 100. For example, when the state of the mobile server satisfies a set condition, the processor 180 may execute or release a lock state which limits an input of a control command of a user for applications.

Meanwhile, the input unit 120 of the server 100 may include a sensing unit 140 and may perform all the functions that the sensing unit 140 performs. For example, the input unit 120 may sense a user touch input.

Meanwhile, the term "wireless communication unit 110" may be used interchangeably with the term "communication unit 110".

Meanwhile, the communication unit 110 may provide an interface for connecting the server 100 to a wired/wireless network including an Internet network. The communication unit 110 may transmit or receive data to or from another user or another electronic device via the connected network or another network linked to the connected network.

The processor 180 may be used interchangeably with the term "controller", "control unit", "microcontroller", or "microprocessor".

Hereinafter, artificial intelligence (AI) will be described briefly.

Artificial intelligence (AI) is one field of computer engineering and information technology for studying a method of enabling a computer to perform thinking, learning, and self-development that can be performed by human intelligence and may denote that a computer imitates an intelligent action of a human.

Moreover, AI is directly/indirectly associated with the other field of computer engineering without being individually provided. Particularly, at present, in various fields of information technology, an attempt to introduce AI components and use the AI components in solving a problem of a corresponding field is being actively done.

Machine learning is one field of AI and is a research field which enables a computer to perform learning without an explicit program.

In detail, machine learning may be technology which studies and establishes a system for performing learning based on experiential data, performing prediction, and autonomously enhancing performance and algorithms relevant thereto. Algorithms of machine learning may use a method which establishes a specific model for obtaining prediction or decision on the basis of input data, rather than a method of executing program instructions which are strictly predefined.

The term "machine learning" may be referred to as "machine learning".

In machine learning, a number of machine learning algorithms for classifying data have been developed. Decision tree, Bayesian network, support vector machine (SVM), and artificial neural network (ANN) are representative examples of the machine learning algorithms.

The decision tree is an analysis method of performing classification and prediction by schematizing a decision rule into a tree structure.

The Bayesian network is a model where a probabilistic relationship (conditional independence) between a plurality of variables is expressed as a graph structure. The Bayesian network is suitable for data mining based on unsupervised learning.

The SVM is a model of supervised learning for pattern recognition and data analysis and is mainly used for classification and regression.

The ANN is a model which implements the operation principle of biological neuron and a connection relationship between neurons and is an information processing system where a plurality of neurons called nodes or processing elements are connected to one another in the form of a layer structure.

The ANN is a model used for machine learning and is a statistical learning algorithm inspired from a neural network (for example, brains in a central nervous system of animals) of biology in machine learning and cognitive science.

In detail, the ANN may denote all models where an artificial neuron (a node) of a network which is formed through a connection of synapses varies a connection strength of synapses through learning, thereby obtaining an ability to solve problems.

The term "ANN" may be referred to as "neural network".

The ANN may include a plurality of layers, and each of the plurality of layers may include a plurality of neurons. Also, the ANN may include a synapse connecting a neuron to another neuron.

The ANN may be generally defined by the following factors: (1) a connection pattern between neurons of a different layer; (2) a learning process of updating a weight of a connection; and (3) an activation function for generating an output value from a weighted sum of inputs received from a previous layer.

The ANN may include network models such as a deep neural network (DNN), a recurrent neural network (RNN), a bidirectional recurrent deep neural network (BRDNN), a multilayer perceptron (MLP), and a convolutional neural network (CNN), but is not limited thereto.

In this specification, the term "layer" may be referred to as "layer".

The ANN may be categorized into single layer neural networks and multilayer neural networks, based on the number of layers.

General single layer neural networks is configured with an input layer and an output layer.

Moreover, general multilayer neural networks is configured with an input layer, at least one hidden layer, and an output layer.

The input layer is a layer which receives external data, and the number of neurons of the input layer is the same the number of input variables, and the hidden layer is located between the input layer and the output layer and receives a signal from the input layer to extract a characteristic from the received signal and may transfer the extracted characteristic to the output layer. The output layer receives a signal from the hidden layer and outputs an output value based on the received signal. An input signal between neurons may be multiplied by each connection strength (weight), and values obtained through the multiplication may be summated. When the sum is greater than a threshold value of a neuron, the neuron may be activated and may output an output value obtained through an activation function.

The DNN including a plurality of hidden layers between an input layer and an output layer may be a representative ANN which implements deep learning which is a kind of machine learning technology.

The term "deep learning" may be referred to as "deep learning".

The ANN may be trained by using training data. Here, training may denote a process of determining a parameter of the ANN, for achieving purposes such as classifying, regressing, or clustering input data. A representative example of a parameter of the ANN may include a weight assigned to a synapse or a bias applied to a neuron.

An ANN trained based on training data may classify or cluster input data, based on a pattern of the input data.

In this specification, an ANN trained based on training data may be referred to as a trained model.

Next, a learning method of an ANN will be described.

The learning method of the ANN may be largely classified into supervised learning, unsupervised learning, semi-supervised learning, and reinforcement learning.

The supervised learning may be a method of machine learning for analogizing one function from training data.

Moreover, in analogized functions, a function of outputting continual values may be referred to as regression, and a function of predicting and outputting a class of an input vector may be referred to as classification.

In the supervised learning, an ANN may be trained in a state where a label of training data is assigned.

Here, the label may denote a right answer (or a result value) to be inferred by an ANN when training data is input to the ANN.

In this specification, a right answer (or a result value) to be inferred by an ANN when training data is input to the ANN may be referred to as a label or labeling data.

Moreover, in this specification, a process of assigning a label to training data for learning of an ANN may be referred to as a process which labels labeling data to training data.

In this case, training data and a label corresponding to the training data may configure one training set and may be inputted to an ANN in the form of training sets.

Training data may represent a plurality of features, and a label being labeled to training data may denote that the label is assigned to a feature represented by the training data. In this case, the training data may represent a feature of an input object as a vector type.

An ANN may analogize a function corresponding to an association relationship between training data and labeling data by using the training data and the labeling data. Also, a parameter of the ANN may be determined (optimized) through evaluating the analogized function.

The unsupervised learning is a kind of machine learning, and in this case, a label may not be assigned to training data.

In detail, the unsupervised learning may be a learning method of training an ANN so as to detect a pattern from training data itself and classify the training data, rather than to detect an association relationship between the training data and a label corresponding to the training data.

Examples of the unsupervised learning may include clustering and independent component analysis.

In this specification, the term "clustering" may be referred to as "clustering".

Examples of an ANN using the unsupervised learning may include a generative adversarial network (GAN) and an autoencoder (AE).

The GAN is a method of improving performance through competition between two different AIs called a generator and a discriminator.

In this case, the generator is a model for creating new data and generates new data, based on original data.

Moreover, the discriminator is a model for recognizing a pattern of data and determines whether inputted data is original data or fake data generated from the generator.

Moreover, the generator may be trained by receiving and using data which does not deceive the discriminator, and the discriminator may be trained by receiving and using deceived data generated by the generator. Therefore, the generator may evolve so as to deceive the discriminator as much as possible, and the discriminator may evolve so as to distinguish original data from data generated by the generator.

The AE is a neural network for reproducing an input as an output.

The AE may include an input layer, at least one hidden layer, and an output layer.

In this case, the number of node of the hidden layer may be smaller than the number of nodes of the input layer, and thus, a dimension of data may be reduced, whereby compression or encoding may be performed.

Moreover, data outputted from the hidden layer may enter the output layer. In this case, the number of nodes of the output layer may be larger than the number of nodes of the hidden layer, and thus, a dimension of the data may increase, and thus, decompression or decoding may be performed.

The AE may control the connection strength of a neuron through learning, and thus, input data may be expressed as hidden layer data. In the hidden layer, information may be expressed by using a smaller number of neurons than those of the input layer, and input data being reproduced as an output may denote that the hidden layer detects and expresses a hidden pattern from the input data.

The semi-supervised learning is a kind of machine learning and may denote a learning method which uses both training data with a label assigned thereto and training data with no label assigned thereto.

As a type of semi-supervised learning technique, there is a technique which infers a label of training data with no label assigned thereto and performs learning by using the inferred label, and such a technique may be usefully used for a case where the cost expended in labeling is large.

The reinforcement learning may be a theory where, when an environment where an agent is capable of determining an action to take at every moment is provided, the best way is obtained through experience without data.

The reinforcement learning may be performed by a Markov decision process (MDP).

To describe the MDP, firstly an environment where pieces of information needed for taking a next action of an agent may be provided, secondly an action which is to be taken by the agent in the environment may be defined, thirdly a reward provided based on a good action of the agent and a penalty provided based on a poor action of the agent may be defined, and fourthly an optimal policy may be derived through experience which is repeated until a future reward reaches a highest score.

The structure of the artificial neural network is specified by the structure of the model, the activation function, the loss function or the cost function, the learning algorithm, and the optimization algorithm. The hyperparameters are preset before learning, and then, the model parameters are set through learning. In this manner, contents of the artificial neural network may be specified.

For example, the factors for determining the structure of the artificial neural network may include the number of hidden layers, the number of hidden nodes included in each hidden layer, an input feature vector, a target feature vector, and the like.

The hyperparameters include various parameters that must be initially set for learning, such as initial values of the model parameters. The model parameters include various parameters to be determined through learning.

For example, the hyperparameters may include a weight initial value between nodes, a deflection initial value between nodes, a mini-batch size, a learning iteration count, a learning rate, and the like. The model parameters may include a weight between nodes, a deviation between nodes, and the like.

The loss function can be used for an index (reference) for determining optimum model parameters in a training process of an artificial neural network. In an artificial neural network, training means a process of adjusting model parameters to reduce the loss function and the object of training can be considered as determining model parameters that minimize the loss function.

The loss function may mainly use a mean squared error (MSE) or a cross entropy error (CEE), and the present disclosure is not limited thereto.

The CEE may be used when a correct answer label is one-hot encoded. One-hot encoding is an encoding method for setting a correct answer label value to 1 for only neurons corresponding to a correct answer and setting a correct answer label to 0 for neurons corresponding to a wrong answer.

A learning optimization algorithm may be used to minimize a loss function in machine learning or deep learning, as the learning optimization algorithm, there are Gradient Descent (GD), Stochastic Gradient Descent (SGD), Momentum, NAG (Nesterov Accelerate Gradient), Adagrad, AdaDelta, RMSProp, Adam, and Nadam.

The GD is a technique that adjusts model parameters such that a loss function value decreases in consideration of the gradient of a loss function in the current state.

The direction of adjusting model parameters is referred to as a step direction and the size of adjustment is referred to as a step size.

At this time, the step size may mean the learning rate.

The gradient descent may be updated by partially differentiating the loss function with each model parameter to obtain the gradient and changing the model parameters by the learning rate in the acquired gradient direction.

The SGD is a technique that increases the frequency of gradient descent by dividing training data into mini-batches and performing the GD for each of the mini-batches.

The Adagrad, AdaDelta, and RMSProp in the SGD are techniques that increase optimization accuracy by adjusting the step size. The momentum and the NAG in the SGD are techniques that increase optimization accuracy by adjusting the step direction. The Adam is a technique that increases optimization accuracy by adjusting the step size and the step direction by combining the momentum and the RMSProp. The Nadam is a technique that increases optimization accuracy by adjusting the step size and the step direction by combining the NAG and the RMSProp.

The learning speed and accuracy of an artificial neural network greatly depends on not only the structure of the artificial neural network and the kind of a learning optimization algorithm, but the hyperparameters. Accordingly, in order to acquire a good trained model, it is important not only to determine a suitable structure of an artificial neural network, but also to set suitable hyperparameters.

In general, hyperparameters are experimentally set to various values to train an artificial neural network, and are set to optimum values that provide stable learning speed and accuracy using training results.

Figure 2:
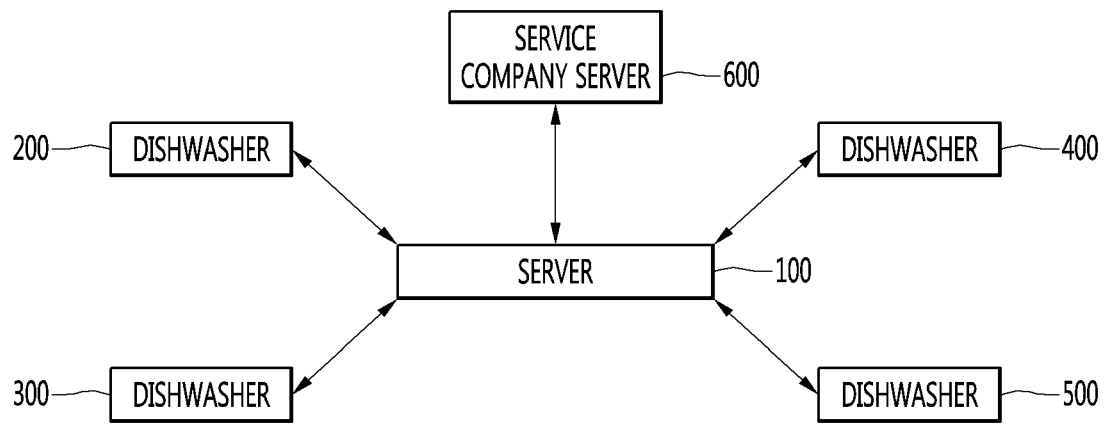
FIG. 2 is a diagram for describing a system for determining the cause of defect occurrence in a dishwasher, according to an embodiment of the present disclosure.

FIG. 2 is a diagram for describing a system 10 for determining the cause of defect occurrence in a dishwasher, according to an embodiment of the present disclosure.

The system 10 for determining the cause of defect occurrence in the dishwasher may include one or more dishwashers 200, 300, 400, and 500, a server 100 communicating with the dishwashers, and a service company server 600.

A processor 180 of the server 100 may communicate with the one or more dishwashers 200, 300, 400, and 500 via a communication unit 110.

Meanwhile, the dishwasher may be a device that cleans dishes by separating contaminants from the dishes by using high-pressure washing water sprayed from spray nozzles.

Each of the one or more dishwashers 200, 300, 400, and 500 may transmit operation information of its own dishwasher to the server 100.

The operation information may be information about the operation of the dishwasher. Specifically, the operation information may include at least one of information sensed by one or more sensors provided in the dishwasher, information received through the input device, information generated by the processor of the dishwasher using the information sensed by the sensor or the information received through the input device, or administrative information.

The processor 180 of the server 100 may acquire the cause of defect occurrence of a specific dishwasher by using the operation information received from the specific dishwasher 200. The processor 180 of the server 100 may transmit the obtained cause of defect occurrence to the user side device of the specific dishwasher 200.

In addition, the processor 180 of the server 100 may receive symptoms generated in the specific dishwasher 200 from the user side device of the specific dishwasher 200.

In this case, the processor 180 of the server 100 may check whether the cause of defect occurrence output from the trained model is right or wrong by using the symptoms generated in the specific dishwasher 200.

In addition, the processor 180 of the server 100 may acquire the cause of defect occurrence of the specific dishwasher by using the output result of the trained model and the symptoms generated in the specific dishwasher 200.

Meanwhile, the processor 180 of the server 100 may communicate with the service company server 600 through the communication unit 110.

The service company may be a company that conducts consultation with the customer (i.e., the user of the dishwasher) or may provide a repair service to the customer.

In addition, the service company server 600 may be a server operated by the service company.

The processor 180 of the server 100 may transmit the cause of defect occurrence of the specific dishwasher 200 to the service company server 600. The processor 180 of the server 100 may receive the evaluation of the cause of defect occurrence of the specific dishwasher 200 from the service company server 600.

Figure 3:
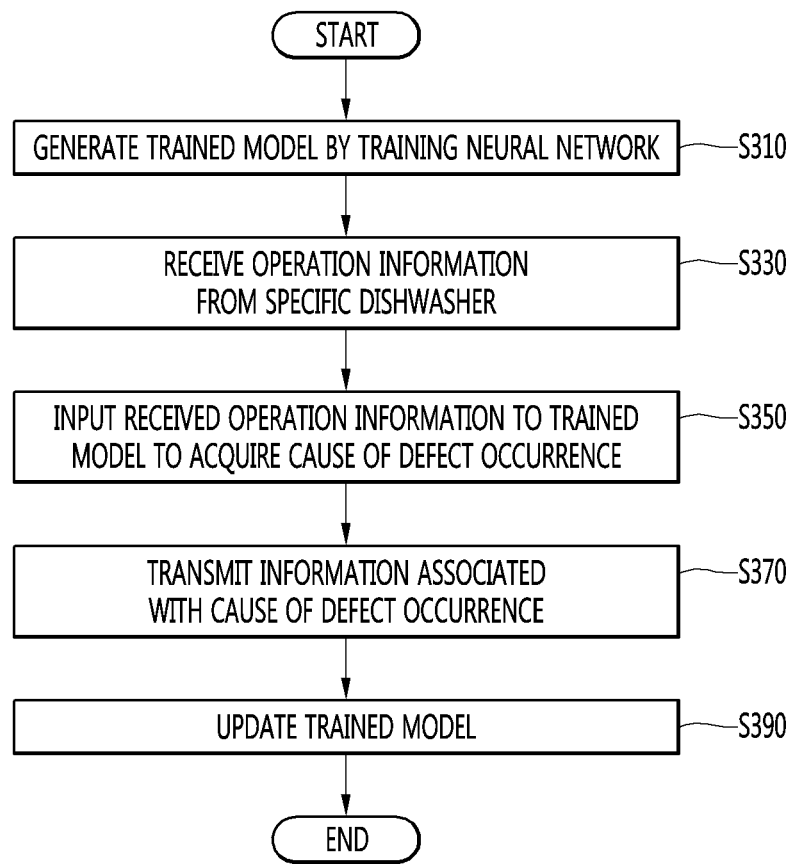
FIG. 3 is a diagram for describing a method for determining the cause of defect occurrence in a dishwasher, according to an embodiment of the present disclosure.

FIG. 3 is a diagram for describing a method for determining the cause of defect occurrence in a dishwasher, according to an embodiment of the present disclosure.

Referring to FIG. 3, the method for determining the cause of defect occurrence of the dishwasher according to an embodiment of the present disclosure may include: generating a trained model by training a neural network by using a plurality of causes of defect occurrence and operation information corresponding to each of the plurality of causes of defect occurrence (S310); receiving operation information of a specific dishwasher from the specific dishwasher (S330); inputting the operation information of the specific dishwasher to the trained model to acquire the cause of defect occurrence of the specific dishwasher (S350); transmitting information about the cause of defect occurrence (S370); and updating the trained model by using the operation information of the specific dishwasher (S390).

First, operation S310 of generating the trained model will be described with reference to FIGS. 4 and 5.

Figure 4:
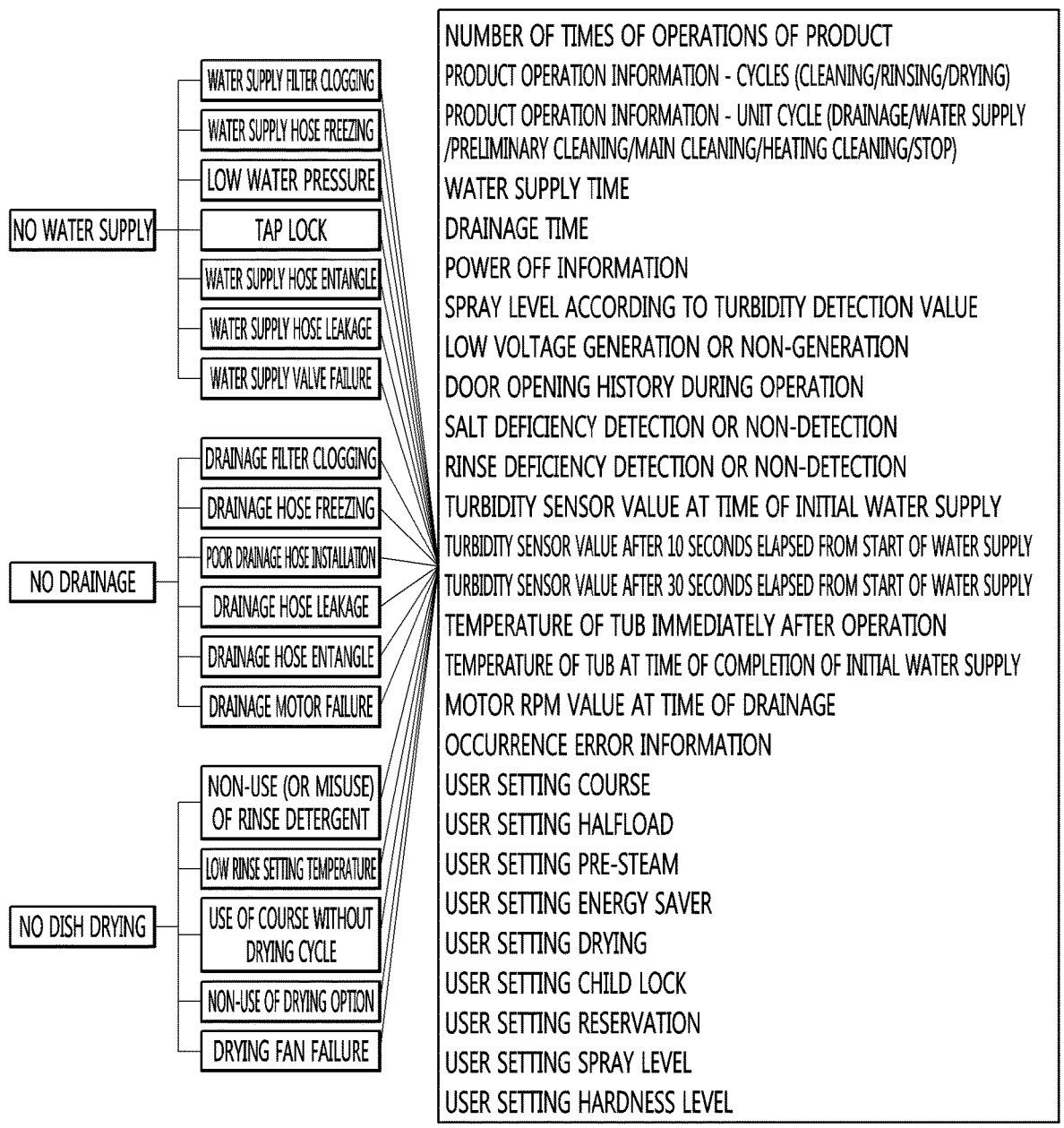
FIG. 4 is a diagram for describing symptoms, cause of defect occurrence, and operation information generated in a dishwasher, according to an embodiment of the present disclosure.

FIG. 4 is a diagram for describing symptoms, cause of defects, and operation information generated in a dishwasher, according to an embodiment of the present disclosure.

As described above, the operation information may be information about the operation of the dishwasher. Specifically, the operation information may include at least one of information sensed by one or more sensors provided in the dishwasher, information received through the input device, information generated by the processor of the dishwasher using the information sensed by the sensor or the information received through the input device, or administrative information.

Meanwhile, the operation information may include at least one of a plurality of elements. For example, as illustrated in FIG. 4, the operation information may include at least one of the number of times of operations of the product, product operation information about cycles (cleaning/rinsing/drying), product operation information about unit cycle (drainage/water supply/preliminary cleaning/main cleaning/heating cleaning/stop), water supply time, drainage time, power off information, a spray level according to a turbidity detection value, low voltage generation or non-generation, a door opening history during operation, salt deficiency detection or non-detection, rinse deficiency detection or non-detection, a turbidity sensor value at the time of the initial water supply, a turbidity sensor value after certain time elapsed from the start of the water supply, a temperature of a tub immediately after operation, a temperature of the tub at the time of completion of the initial water supply, a motor RPM value at the time of drainage, occurrence error information, a user setting course, a user setting HalfLoad, a user setting pre-steam, a user setting energy saver, a user setting drying, a user setting child lock, a user setting reservation, a user setting spray level, or a user setting hardness level.

Meanwhile, the defects may include non-operation or performance deterioration of the dishwasher.

Here, the non-operation of the dishwasher may mean that the dishwashing function is not performed. For example, the non-operation of the dishwasher may mean that the washing water is not supplied and the dishwashing function is not performed.

In addition, the performance deterioration of the dishwasher may mean that the dishwashing function is deteriorated although the dishwasher performs the dishwashing function. For example, the performance deterioration of the dishwasher may indicate a state in which leakage occurs in the water supply hose and the spray level is lowered.

Meanwhile, the cause of defect occurrence may mean the factors that cause the non-operation or performance deterioration of the dishwasher.

For example, the cause of defect occurrence may include at least one of water supply filter clogging, water supply hose freezing, low water pressure, tap lock, water supply hose entangle, water supply hose leakage, water supply valve failure, drainage filter clogging, drainage hose freezing, poor drainage hose installation, drainage hose leakage, drainage hose entangle, drainage motor failure, non-use of detergent, wrong use of detergent, non-use of dedicated detergent, low rinse setting temperature, use of course without drying cycle, non-use of drying option, or drying fan failure.

Meanwhile, when the defect occurs, the defect may affect at least one of the plurality of elements of the operation information. That is, when a specific cause of defect occurrence occurs, at least one value of the plurality of elements of the operation information may be changed.

An example of the effect of the cause of defect occurrence on at least one of the plurality of elements of the operation information is shown in Table 1.

TABLE 1

| Symptom | Cause of defect occurrence | Defect phenomenon data features |
|---|---|---|
| No water supply | Water supply clogging | Product usage frequency is relatively high, and change width of water supply time is small (predetermined level is maintained). |
| | Water supply hose freezing | Temperature of tub at time point immediately after operation is low. |
| | Low water pressure | Water supply time is relatively long. There is no history of water supply within normal time range. |
| | Tap lock | Product usage frequency is relatively low, and change width of water supply time is large. |
| | Water supply hose entangle | Product usage frequency is relatively low, and change width of water supply time is large. |
| | Water supply hose leakage | Product usage frequency is relatively high, and there is change in water supply time. |
| | Water supply valve failure | No actual amount of water supply. |
| No drainage | Drainage filter clogging | Drainage time is relatively long. Product usage frequency is relatively high, and turbidity sensor value is low. Drainage RPM is measured. |
| | Drainage hose freezing | Temperature of tub at time point immediately after operation is low. Drainage time is relatively long. Drainage RPM is measured. |
| | Drainage hose installation failure | Product usage frequency is relatively low, and there is no history of drainage in normal time range. Drainage RPM is measured. |
| | Drainage hose leakage | Product usage frequency is relatively high, and there is change in drainage time. Drainage RPM is measured. |
| | Drainage hose entangle | Product usage frequency is relatively low, and change width of drainage time is large. Drainage RPM is measured. |
| | Drainage motor failure | Drainage RPM is not measured. |
| No dish drying | Non-use of detergent | Rinse deficiency is detected. |
| | Misuse of detergent | Rinse deficiency is not detected. Bubbles are detected. |
| | Low rinse setting temperature | There is no rinse temperature option setting information. Rinse deficiency is not detected. Bubbles are not detected. |
| | Use of course without drying cycle | Course setting information is course having no drying cycle. Rinse deficiency is not detected. Bubbles are not detected. |
| | Non-use of drying option | There is no drying option setting information. Rinse deficiency is not detected. Bubbles are not detected. |
| | Drying fan failure | There is no difference between drying fan on time point and time point after elapse of predetermined time. Rinse deficiency is not detected. Bubbles are not detected. |

Therefore, by training the neural network by matching the operation information in the case where the cause of defect occurrence exists with the cause of defect occurrence, a trained model that can infer the cause of defect occurrence by using the operation information may be generated.

Figure 5:
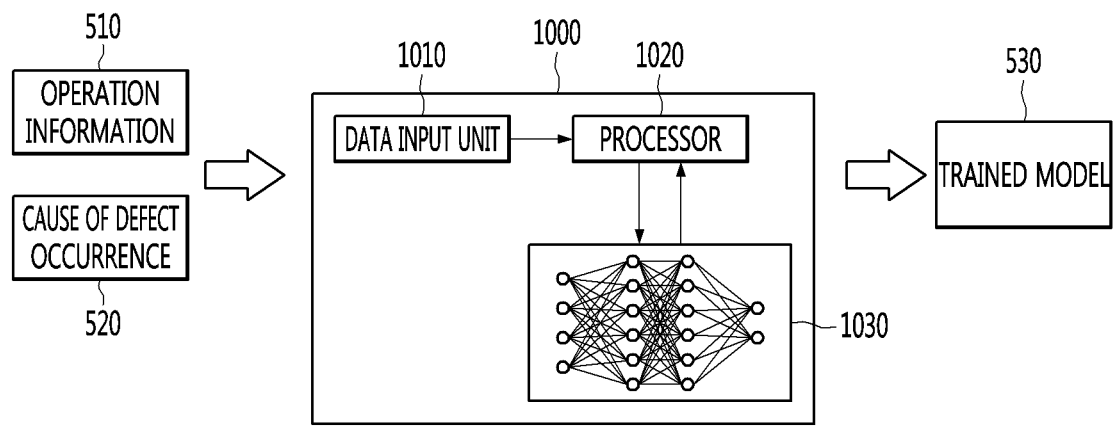
FIG. 5 is a diagram for describing a method for generating a trained model by training of a neural network, according to an embodiment of the present disclosure.

FIG. 5 is a diagram for describing a method for generating a trained model by training of a neural network, according to an embodiment of the present disclosure.

Hereinafter, it is assumed that the trained model 530 is generated in the trained device 1000 of the neural network. However, the following process may also be performed in the server 100.

The trained device 1000 of the neural network may include a data input unit 1010, a processor 1020, and a neural network 1030.

The data input unit 1010 may receive input data. In this case, the data input unit 1010 may receive training data and may receive unprocessed data.

When the data input unit 1010 receives the unprocessed data, the processor 1020 may preprocess the received data to generate training data that can be input to the neural network 1030.

The neural network 1030 may be implemented in hardware, software, or a combination of hardware and software.

When all or part of the neural network 1030 is implemented in software, one or more instructions constituting the neural network 1030 may be stored in a memory (not illustrated) included in the trained device 1000 of the neural network.

The processor 1020 may input training data or a training set into the neural network 1030 to train the neural network 1030.

Specifically, the processor 1020 may determine (optimize) parameters of the artificial neural network (ANN) by repeatedly training the ANN using various training techniques described above.

The artificial neural network whose parameters have been determined by training using training data may be referred to as a trained model 530 in this specification.

Meanwhile, the trained model 530 may be used to infer result values for new input data rather than training data.

Meanwhile, in the present disclosure, operation information 510 may be used as training data, and the cause of defect occurrence 520 may be input to the neural network together with the operation information 510 as a label.

Specifically, the processor 1020 may train the neural network by using a plurality of causes of detect occurrence and operation information corresponding to each of the plurality of causes of defect occurrence.

The operation information corresponding to each of the plurality of causes of defect occurrence may mean operation information acquired in the dishwasher in a state in which the defect occurs in the dishwasher.

In this case, a value of a part of the operation information may be determined according to the cause of defect occurrence, and a value of another part of the operation information may be determined regardless of the cause of defect occurrence.

The processor 1020 may train the neural network by labeling the operation information corresponding to each of the plurality of causes of defect occurrence to the plurality of causes of defect occurrence and inputting the same to the neural network.

For example, the processor 1020 may label, to a first cause of defect occurrence, the operation information of the dishwasher in a state in which the first cause of defect occurrence exists, and may input, to the neural network, the operation information of the dishwasher and the first cause of defect occurrence in a state in which the first cause of defect occurrence exists.

As another example, the processor 1020 may label, to a second cause of defect occurrence, the operation information of the dishwasher in a state in which the second cause of defect occurrence exists, and may input, to the neural network, the operation information of the dishwasher and the second cause of defect occurrence in a state in which the second cause of defect occurrence exists.

Accordingly, various causes of defect occurrence and corresponding operation information may be input to the neural network 1030 as training data.

In this case, the processor 1020 may repeatedly train the neural network by using map training among the various training techniques described above.

In this case, the neural network 1030 may infer the function of the correlation between the operation information and the cause of defect occurrence by using the operation information and the cause of defect occurrence labeled to the operation information. In addition, the neural network 1030 may determine (optimize) the parameters of the neural network 1030 through the evaluation of the inferred function.

The trained neural network 1030 may be implemented in hardware, software, or a combination of hardware and software. When all or part of the trained neural network 1030 is implemented in software, one or more instructions constituting the neural network 1030 may be stored in a memory (not illustrated) included in the trained device 1000 of the neural network.

Therefore, as the neural network 1030 is trained, a training result acquired by using the plurality of causes of defect occurrence and the operation information corresponding to each of the plurality of causes of defect occurrence may be stored in the memory (not illustrated). The training result may include a relationship parameter corresponding to the relationship between the plurality of causes of defect occurrence and the operation information.

Specifically, the processor 1020 may train the neural network 1030 by using the plurality of causes of detect occurrence and the operation information corresponding to each of the plurality of causes of defect occurrence.

As the neural network 1030 is trained, the model parameters of the neural network 1030 may be set to correspond to the correlation between a plurality of bad cause and the action information.

The model parameters of the neural network 1030 may include at least one of a weight or a bias corresponding to the correlation between the plurality of causes of defect occurrence and the operation information.

The relationship parameter may mean the model parameter of the neural network trained by using the plurality of causes of defect occurrence and the operation information corresponding to each of the plurality of causes of defect occurrence. That is, the training result (relationship parameter) may constitute a part of the trained neural network.

Meanwhile, the neural network trained by using the operation information and the cause of defect occurrence labeled to the operation information may be referred to as the trained model 530.

The trained model 530 (trained neural network) may be mounted on the server 100.

Meanwhile, the trained model 530 (trained neural network) may be implemented in hardware, software, or a combination of hardware and software. When all or part of the trained neural network 1030 is implemented in software, one or more instructions constituting the trained model may be stored in the memory 170 of the server 100.

One or more instructions implementing the trained model are stored in the memory 170, the training results constituting a part of the training model, that is, the training results acquired by using the plurality of defect occurrence and the operation information corresponding to each of the plurality of defect occurrence may be stored in the memory 170.

As described above, the training results stored in the memory 170 may include a relationship parameter corresponding to the relationship between the plurality of causes of defect occurrence and the operation information. In addition, the relationship parameter may mean the model parameter of the neural network (that is, the neural network mounted on the server 100) trained by using the plurality of causes of defect occurrence and the operation information corresponding to each of the plurality of causes of defect occurrence.

When the trained neural network is implemented in hardware, the trained neural network may be integrated into a hardware chip to form a part of the processor 180.

For example, the trained neural network may be manufactured in the form of a dedicated hardware chip for artificial intelligence, or may be manufactured as part of a conventional general purpose processor (e.g., a CPU or an application processor) or a graphics dedicated processor (e.g., a GPU).

Meanwhile, as the trained neural network is implemented in hardware, training results constituting a part of the neural network, that is, training results acquired by using the plurality of causes of defect occurrences and the operation information corresponding to each of the plurality of defect occurrences may be implemented in hardware to constitute a part of the processor 180.

When the trained neural network is implemented in a combination of hardware and software, the trained neural network may be integrated into a hardware chip to form part of the processor 180, and one or more instructions implementing the trained neural network may be stored in the memory 170.

As the trained neural network is implemented in a combination of hardware and software, training results constituting a part of the trained neural network, that is, training results acquired by using the plurality of causes of defect occurrences and the operation information corresponding to each of the plurality of defect occurrences may be implemented in hardware to constitute a part of the processor 180, or may be stored in the memory 170.

Meanwhile, the cause of defect occurrence may be determined by clearly distinguishing the phenomenon into two or more classes. For example, when the cause of defect occurrence is misuse of a detergent, the cause of defect occurrence may be determined according to whether a dedicated detergent is used or a detergent other than the dedicated detergent is used.

However, the present disclosure is not limited thereto, and the cause of defect occurrence may include a progress degree. For example, when 50% of the water supply filter is clogged to cause the defect, the cause of defect occurrence may include water supply filter clogging and 50%. As another example, when 98% of the water supply filter is clogged to cause the defect, the cause of defect occurrence may include water supply filter clogging and 95%.

In this case, the operation information corresponding to each of the plurality of causes of defect occurrence may mean operation information acquired by the dishwasher in correspondence to the progress degree of the cause of defect occurrence.

In this case, the processor 1020 may train the neural network 1030 by labeling the operation information corresponding to each of the plurality of causes of defect occurrence to the plurality of causes of defect occurrence and inputting the same to the neural network.

For example, the processor 1020 may label, to the first cause of defect occurrence, the operation information of the dishwasher in a state in which a first cause of defect occurrence (cause of defect occurrence: water supply filter clogging, progress degree: 50%) exists, and may input, to the neural network, the operation information of the dishwasher and the first cause of defect occurrence in a state in which the first cause of defect occurrence exists.

In addition, the processor 1020 may label, to the second cause of defect occurrence, the operation information of the dishwasher in a state in which a second cause of defect occurrence (cause of defect occurrence: water supply filter clogging, progress degree: 70%) exists, and may input, to the neural network, the operation information of the dishwasher and the second cause of defect occurrence in a state in which the second cause of defect occurrence exists.

Meanwhile, operation S330 of receiving the operation information of the specific dishwasher from the specific dishwasher and operation S350 of acquiring the cause of defect occurrence of the specific dishwasher by inputting the operation information of the specific dishwasher into the training model will be described with reference to FIG. 6.

Figure 6:
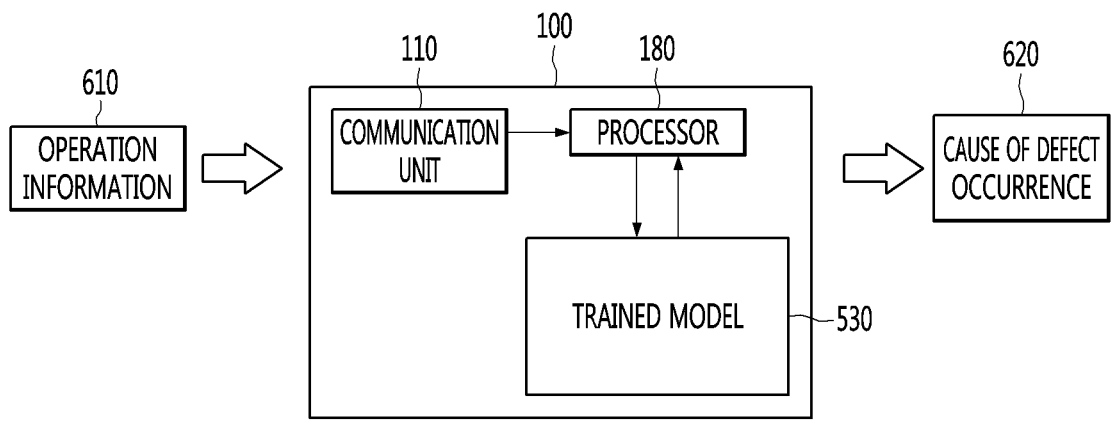
FIG. 6 is a diagram for describing a method for acquiring the cause of defect occurrence in a dishwasher, according to an embodiment of the present disclosure.

FIG. 6 is a diagram for describing a method for acquiring the cause of defects in a dishwasher, according to an embodiment of the present disclosure.

The server 100 may receive operational information from any one of the at least one dishwasher 200, 300, 400, and 500. The dishwasher having transmitted the operation information is referred to as a specific dishwasher 200.

The processor 180 may receive operation information 610 of the specific dishwasher 200 from the specific dishwasher 200 through the communication unit 110.

Meanwhile, the processor 180 may acquire the cause of defect occurrence of the specific dishwasher 200 by using the operation information and the training result of the specific dishwasher 200.

Specifically, the processor 180 may input the operation information of the specific dishwasher 200 to the trained model 530.

In the training operation described above, the neural network has been trained by using the plurality of causes of defect occurrence and the operation information corresponding to each of the plurality of causes of defect occurrence.

Therefore, with respect to the operation information of the specific dishwasher 200, which is new input data, the trained model 530 may output the cause of defect occurrence that is predicted to cause the defect.

In this case, the processor 180 may use the output of the trained model 530 to acquire the cause 620 of defect occurrence of the specific dishwasher.

Specifically, when the trained model 530 outputs a predetermined value or more as a score or a probability value of a specific cause of defect occurrence, the processor 180 may determine that a defect occurs in a specific dishwasher and may determine the specific cause of defect occurrence as the cause 620 of defect occurrence of the specific dishwasher.

Meanwhile, the cause of defect occurrence acquired by the processor 180 may include the progress degree of the cause of defect occurrence. For example, the processor 180 may acquire the cause of defect occurrence including a water supply filter clogging and 50%.

As described above, according to the present disclosure, by training the neural network using motion information collected from various defective states, there is an advantage in that it is possible to grasp various cause of defects that may occur in the dishwasher even if the device or algorithm for determining defects is not separately provided according to the type of defect.

Meanwhile, operation S370 of transmitting information about the cause of defect occurrence will be described with reference to FIGS. 7 to 1b.

Figure 7:
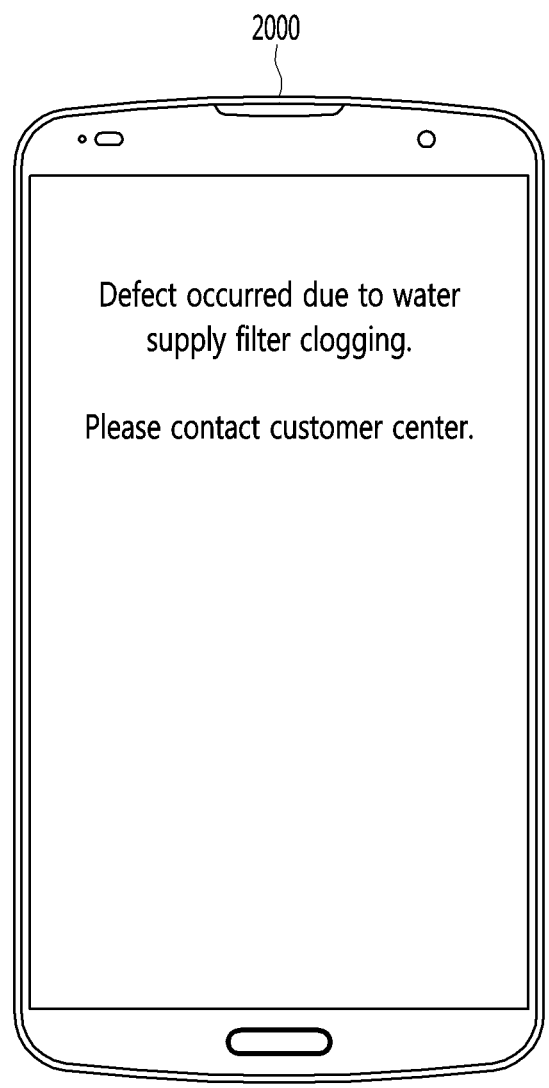
FIG. 7 is a diagram for describing a method for transmitting the cause of defect occurrence to a user, according to an embodiment of the present disclosure.

FIG. 7 is a diagram for describing a method for transmitting the cause of defect occurrence to a user, according to an embodiment of the present disclosure.

When the cause of defect occurrence of the specific dishwasher 200 is acquired, the processor 180 may transmit the acquired cause of defect occurrence to the user side device 2000 of the specific dishwasher 200 through the communication unit 110.

In this case, the user side device 2000 of the specific dishwasher may receive and output the cause of defect occurrence.

For example, the user side device 2000 may display a message indicating that water supply filter clogging has occurred.

In FIG. 7, the user side device 2000 of the specific dishwasher 200 is illustrated as being a user's mobile terminal of a specific dishwasher, the present disclosure is not limited thereto. The user side device 2000 of the specific dishwasher 200 may be a specific dishwasher 200.

Meanwhile, when the cause of defect occurrence of the specific dishwasher 200 is acquired, the processor 180 may transmit the acquired cause of defect occurrence to the service company server 300 through the communication unit 110.

It is important to accurately determine the cause of defect occurrence so as to repair the dishwasher. However, the customer may only explain symptoms such as water supply disorder, drainage disorder, dryness disorder, etc., and it is difficult to explain specifically what causes the defect.

Specifically, referring again to FIG. 4, the plurality of causes of defect occurrence may be classified into a plurality of symptoms.

For example, water supply filter clogging, water supply hose freezing, low water pressure, tap lock, water supply hose entangle, water supply hose leakage, and water supply valve failure may cause symptoms such as "water supply failure" or "water supply performance deterioration".

Drainage filter clogging, drainage hose freezing, drainage hose installation failure, drainage hose leakage, drainage hose entangle, and drainage motor failure may cause symptoms such as "no drainage" or "drainage performance deterioration".

In addition, non-use of detergent, wrong use of detergent, non-use of dedicated detergent, low rinse setting temperature, use of course without drying cycle, non-use of drying option, or drying fan failure may cause symptoms such as "no dish drying" or "dish drying performance deterioration".

However, in terms of users of dishwashers, it is only possible to grasp symptoms such as water supply disorder, drainage disorder, dryness disorder, etc., and it is difficult to grasp what causes the cause of defect occurrence.

However, according to the present disclosure, the occurrence of defects and the cause of defect occurrence may be grasped in advance and provided to customers. Therefore, customers may quickly become aware of the occurrence of defects and may quickly request service from a service company. Also, customers may get fast and accurate service by informing the service company about the cause of defect occurrence.

Further, according to the present disclosure, it is possible to grasp the occurrence of defects and the cause of defect occurrence in advance and provide them to the service center. Therefore, the service center may prepare a repair service by grasping the occurrence of defect in advance, and even if it is possible to quickly and accurately recognize the cause of defect occurrence without visiting the site, and know a repair method in advance, or prepare the necessary parts in advance.

Figure 8:
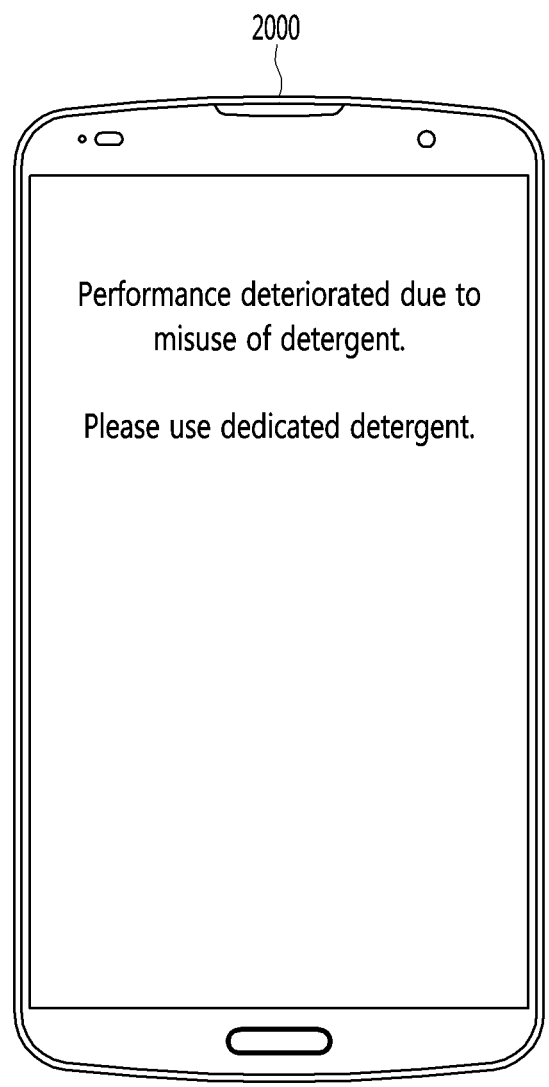
FIG. 8 is a diagram for describing a method for providing a user with a usage method corresponding to an erroneous operation, according to an embodiment of the present disclosure.

FIG. 8 is a diagram for describing a method for providing a user with a usage method corresponding to an erroneous operation, according to an embodiment of the present disclosure.

When the cause of defect occurrence of the specific dishwasher 200 is acquired and the cause of defect occurrence of the specific dishwasher is associated with the erroneous operation of the user, the processor 180 may transmit a usage method corresponding to the erroneous operation to the user side device 2000 of the specific dishwasher.

In this case, the user side device 2000 of the specific dishwasher may receive and output the usage method corresponding to the erroneous operation.

For example, when the cause of defect occurrence is misuse of the detergent (non-use of dedicated detergent), the processor 180 may transmit a usage method (use of dedicated detergent) corresponding to the misuse to the user side device 2000.

For example, the user side device 2000 may display a message indicating "please use dedicated detergent."

The defects occurring in the dishwasher are often caused by incorrect use of the customer, not by malfunction. However, even in such a case, it is difficult to grasp that it is defective due to the wrong use of the customer, so that the consultation time with the customer is prolonged or the repairer may have to visit the customer directly.

However, according to the present disclosure, since it is determined that the defect is caused by the misuse of the user, the user is informed of the correct usage method, thereby saving cost and time and extending the service life of the product.

Figure 9:
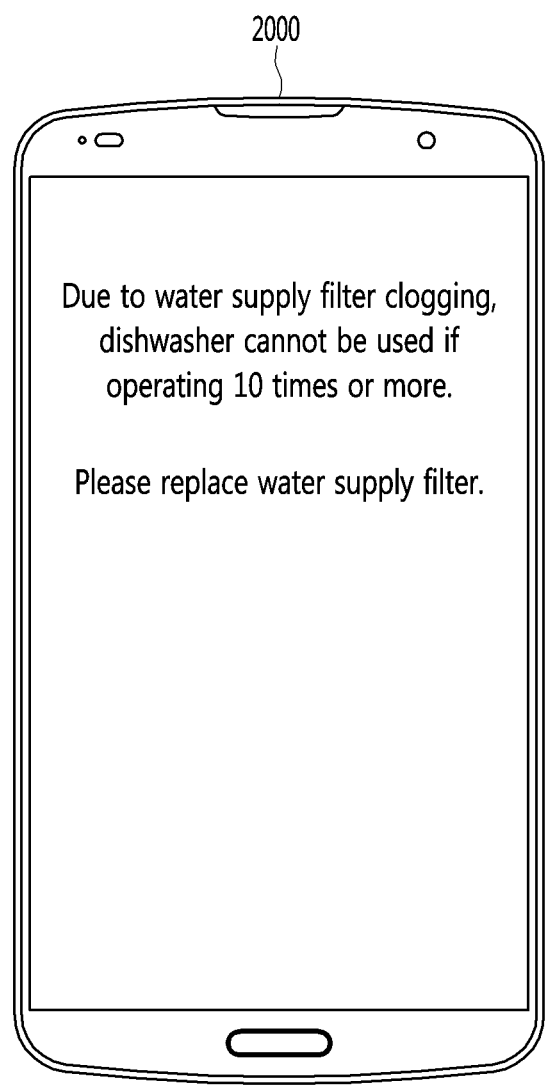
FIG. 9 is a diagram for describing a method for predicting a failure or transferring maintenance information, according to an embodiment of the present disclosure.

FIG. 9 is a diagram for describing a method for predicting a failure or transferring maintenance information, according to an embodiment of the present disclosure.

The processor 180 may acquire the progress degree of the cause of defect occurrence of the specific dishwasher by using the operation information and the training result of the specific dishwasher.

Specifically, the processor 180 may acquire the progress degree of the cause of defect occurrence of the specific dishwasher by inputting the operation information of the specific dishwasher to the trained model.

For example, the processor 180 may acquire the cause of defect occurrence including a water supply filter clogging and 50%.

In this case, the processor 180 may acquire information about the defect occurrence time based on the progress degree of the cause of defect occurrence.

The term "defect" may mean that the performance of the function cannot be performed or the performance of the function is lowered to a certain value or less. For example, the defect may mean that the water supply function is not performed, or that the performance of the water supply function is deteriorated to 20% or less.

The processor 180 may acquire information about the defect occurrence time based on the progress degree of the cause of defect occurrence, and may transmit information about the defect occurrence time to the user side device 2000 of the specific dishwasher.

In this case, the user side device 2000 of the specific dishwasher may display the information about the defect occurrence time.

For example, since the water supply filter is clogged during operation ten more times and thus the water supply filter cannot perform the water supply function, the user side device 2000 of the specific dishwasher may output a message indicating that the dishwasher cannot be used.

Meanwhile, the processor 180 may acquire maintenance/repair information based on the progress degree of the cause of defect occurrence.

Here, the maintenance/repair is performed so as to maintain the performance of the dishwasher, and may include, for example, replacement time of consumables, cleaning time, and the like.

The processor 180 may acquire information about the maintenance/repair information based on the progress degree of the cause of defect occurrence, and may transmit the maintenance/repair information to the user side device 2000 of the specific dishwasher.

In this case, the user side device 2000 of the specific dishwasher may display the maintenance/repair information.

For example, the user side device 2000 of the specific dishwasher may output a message indicating that the water supply filter needs to be replaced at a predetermined current or future time point.

According to the present disclosure, it is possible to predict the defect occurrence time or the maintenance/repair time according to the prediction of the cause of defect occurrence. Therefore, the user can perform appropriate management according to the guidance to prevent the performance deterioration of the product. In addition, since the user has only to request the service company for management or performs direct management only when the guidance is received, without periodic management, cost and time may be saved.

Figure 10:
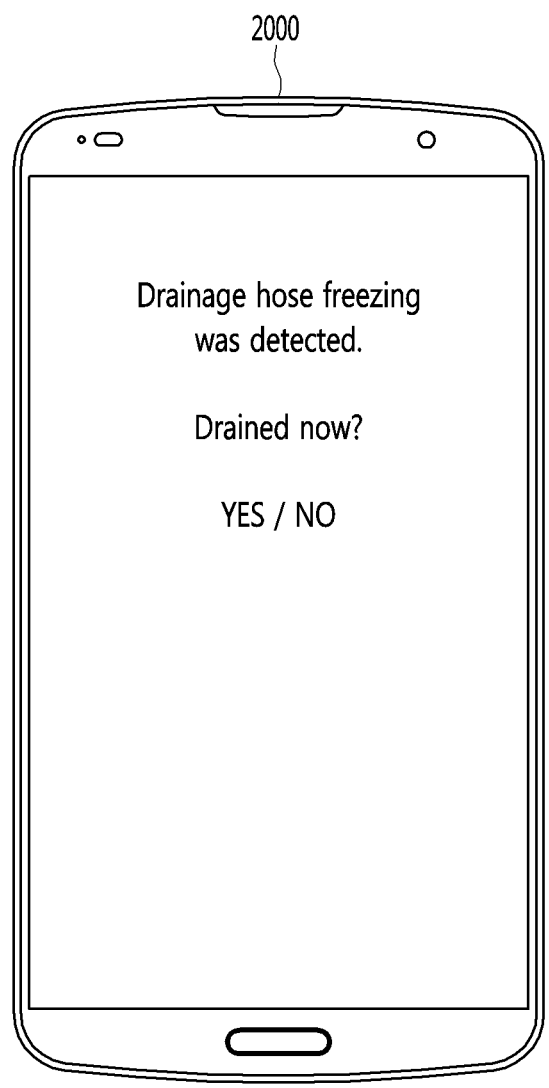
FIG. 10 is a diagram for describing a method for confirming whether the cause of defect occurrence output from a trained model is correct based on feedback of a customer, according to an embodiment of the present disclosure.

FIG. 10 is a diagram for describing a method for confirming whether the cause of defect occurrence output from a trained model is correct based on feedback of a customer, according to an embodiment of the present disclosure.

The trained model may output incorrect results. That is, the trained model may incorrectly predict the cause of defect occurrence. When the incorrectly predicted cause of defect occurrence is notified to the customer or the service company, it can cause confusion.

Therefore, the server 100 may confirm whether the cause of defect occurrence output from the trained model is correct, based on the feedback of the customer.

Specifically, the processor 100 may receive the symptom generated in the specific dishwasher 200 through the communication unit 110.

More specifically, when the cause of defect occurrence is acquired, the processor 100 may transmit a request for confirming the cause of defect occurrence to the user side device 2000 of the specific dishwasher.

In this case, the user side device 2000 of the specific dishwasher may output a message for confirming whether the acquired cause of defect occurrence is correct.

In this case, the user side device 2000 of the specific dishwasher may output a message for confirming whether the acquired cause of defect occurrence is correct.

Meanwhile, the user side device 2000 of the specific dishwasher may receive an input of a symptom generated in the specific dishwasher.

For example, when the drainage of the dishwasher is not actually performed, the user side 2000 device of the specific dishwasher may receive, from the user, an input of a symptom indicating that the drainage is not performed.

In this case, the user side device 2000 of the specific dishwasher may transmit, to the server 100, the symptom generated in the specific dishwasher.

Meanwhile, the processor 180 may receive the symptom generated in the specific dishwasher and determine whether the acquired cause of defect occurrence corresponds to the received symptom.

Specifically, the processor 180 may determine whether the acquired cause of defect occurrence is classified as the received symptom.

When the acquired cause of defect occurrence corresponds to the received symptom (that is, when the acquired cause of defect occurrence is classified as the received symptom), the processor 180 may determine that the acquired cause of defect occurrence is right.

When the acquired cause of defect occurrence does not correspond to the received symptom (that is, when the acquired cause of defect occurrence is not classified as the received symptom), the processor 180 may determine that the acquired cause of defect occurrence is wrong.

For example, when the cause of defect occurrence acquired by using the output result of the trained model is the drainage hose freezing and the received symptom is no drainage, the processor 180 may determine that the acquired cause of defect occurrence is right.

As another example, when the cause of defect occurrence acquired by using the output result of the trained model is the drainage hose freezing and the received symptom is no water supply, the processor 180 may determine that the acquired cause of defect occurrence is wrong.

Meanwhile, when it is determined that the acquired cause of defect occurrence is right, the processor 180 may transmit the acquired cause of defect occurrence to the user side device of the specific dishwasher or the service company server.

As described above, according to the present disclosure, it is possible to provide the user or the service company with the cause of defect occurrence with a high degree of accuracy by comparing the cause of defect occurrence acquired by using the trained model with the symptom generated in the dishwasher.

Figure 11A:
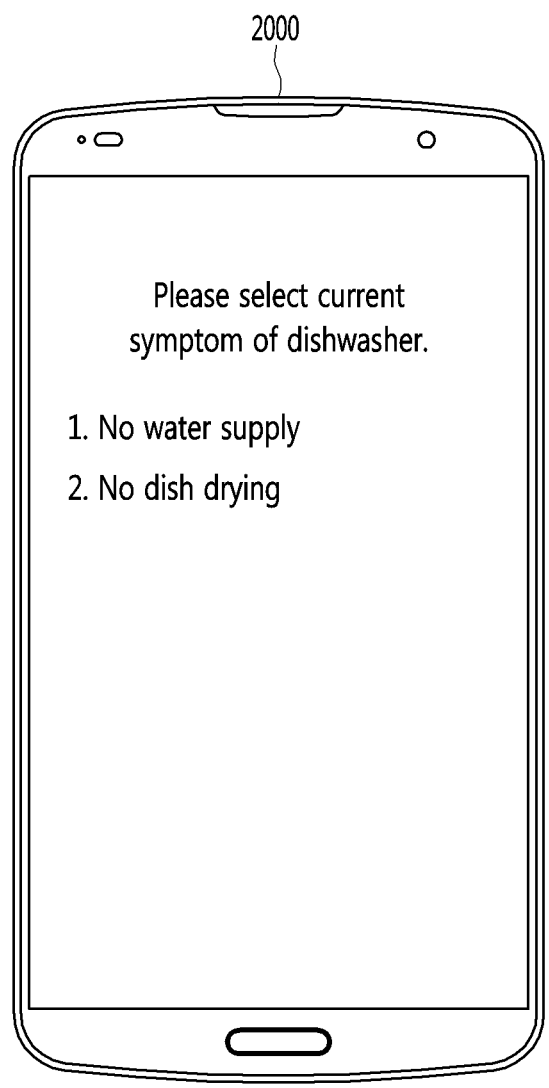
FIGS. 11A and 11B are diagrams for describing a method for determining the cause of defect occurrence based on feedback of a customer, according to an embodiment of the present disclosure.
Figure 11B:
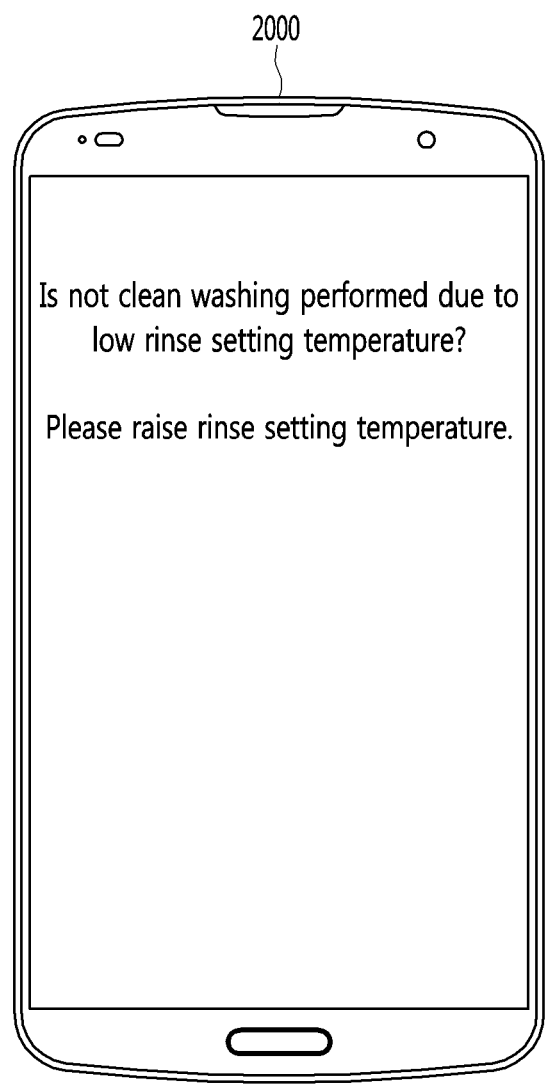

FIG. 11 is a diagram for describing a method for determining the cause of defect occurrence based on feedback of a customer, according to an embodiment of the present disclosure.

The trained model may output a score (or probability) for each of a plurality of classes. It is assumed that the trained model outputs a high score (or probability) for a plurality of causes of defect occurrence. For example, it is assumed that the trained model outputs a score (or probability) equal to or greater than a predetermined value with respect to water supply filter clogging and detergent misuse.

In this case, only the first cause of defect occurrence (water supply filter clogging) may be correct, and only the second cause of defect occurrence (drying fan failure) may be correct. In addition, both the first cause of defect occurrence (water supply filter clogging) and the second cause of defect occurrence (drying fan failure) may be correct.

Therefore, the server 100 may determine the cause of defect occurrence of the specific dishwasher based on the feedback of the customer.

Specifically, the processor 100 may receive the symptom generated in the specific dishwasher 200 through the communication unit 110.

More specifically, when the cause of defect occurrence is acquired, the processor 100 may transmit a request for determining the cause of defect occurrence to the user side device 2000 of the specific dishwasher.

Here, the request for determining the cause of defect occurrence may include a plurality of symptoms each corresponding to a plurality of causes of defect occurrence having a score (or probability) higher than a predetermined value.

In this case, the user side device 2000 of the specific dishwasher may output a plurality of symptoms respectively corresponding to a plurality of causes of defect occurrence, and may receive, from the user, an input of a symptom generated in the specific dishwasher.

For example, when the water supply of the dishwasher is not performed, the user side 2000 device of the specific dishwasher may receive, from the user, an input of a symptom indicating that the water supply is not performed.

For example, when the water supply and the dish drying of the dishwasher are not performed, the user side 2000 device of the specific dishwasher may receive, from the user, an input of a symptom indicating that the water supply and the dish drying are not performed.

In this case, the user side device 2000 of the specific dishwasher may transmit, to the server 100, the symptom generated in the specific dishwasher.

Meanwhile, the processor 180 may receive the symptom generated in the specific dishwasher, and may determine the cause of defect occurrence of the specific dishwasher based on the output result of the trained model and the symptom generated in the specific dishwasher.

Specifically, the processor 180 may select a cause of the defect occurrence corresponding to the received symptom among a plurality of defect occurrence causes having a score (or a probability) higher than a predetermined value. The processor 180 may transmit the selected cause of defect occurrence to the user side device or the service company.

For example, when the water supply filter clogging and dry fan failure have a score (or probability) equal to or greater than a predetermined value and the received symptom is no water supply, the processor 180 may select the water supply filter clogging and transmit the water supply filter clogging to the user side device or the service company server.

As another example, when the water supply filter clogging and dry fan failure have a score (or probability) equal to or greater than a predetermined value and the received symptom is no water supply and no dish drying, the processor 180 may select the water supply filter clogging and no dish drying and transmit the water supply filter clogging to the user side device or the service company server.

As described above, according to the present disclosure, it is possible to accurately grasp the cause of defect occurrence and provide the grasped cause of defect occurrence to the user or the service company by comparing the cause of defect occurrence acquired by using the trained model with the symptom generated in the dishwasher.

Next, operation S390 of updating the trained model by using the operation information of the specific dishwasher will be described with reference to FIG. 12.

Figure 12:
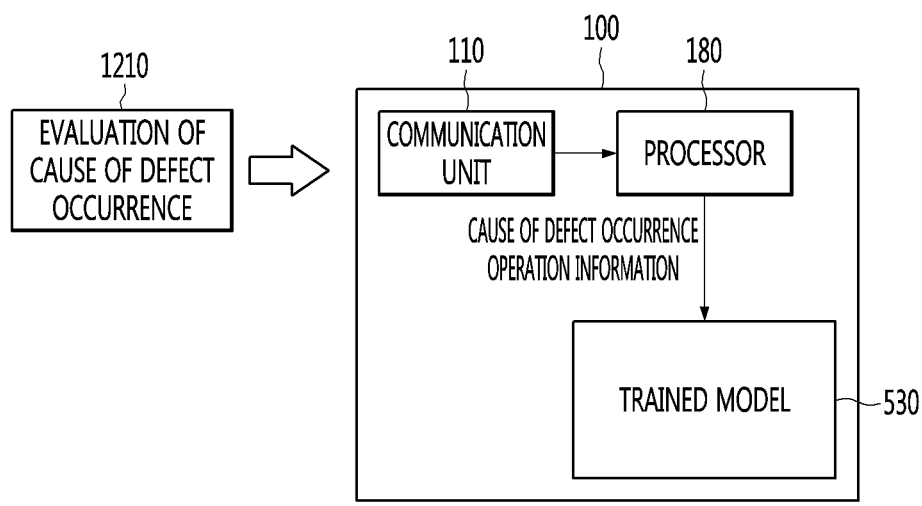
FIG. 12 is a diagram for describing a method for updating a trained model by retraining a neural network by using received operation information, according to an embodiment of the present disclosure.

FIG. 12 is a diagram for describing a method for updating a trained model by retraining a neural network by using received operation information, according to an embodiment of the present disclosure.

The processor 180 may transmit the cause of defect occurrence to the service company server 600 and receive the evaluation 1210 of the cause of defect occurrence from the service company server 600.

The evaluation 1210 of the cause of defect occurrence is made by directly checking the dishwasher by the service company, and may include information about whether the cause of defect occurrence transmitted by the processor 180 is right or wrong. In addition, when the cause of defect occurrence transmitted by the processor 180 is wrong, the evaluation 1210 of the cause of defect occurrence may include the cause of defect occurrence determined by the service company.

Meanwhile, the processor 180 may update the training result by using the operation information received from the specific dishwasher 200 and the cause of defect occurrence determined by the service company.

Specifically, when the cause of defect occurrence acquired in the server 100 is wrong, the processor 180 may update the trained model 530 by using the operation information of the specific dishwasher 200 and the cause of defect occurrence received from the service company server 600.

More specifically, when the operation information is received from the particular dishwasher and the received operation information is input to the trained model to acquire the cause of defect occurrence, the processor 180 may store the operation information received from the specific dishwasher in the memory 170 and transmit the cause of defect occurrence to the service company server 600.

When the cause of defect occurrence transmitted by the processor 180 is wrong, the processor 180 may receive, from the service company server, the cause of defect occurrence determined by the service company.

In this case, the processor 180 may perform map training on the neural network by labeling the operation information stored in the memory 170 to the cause of defect occurrence determined by the service company.

In this case, the training result may be updated. Specifically, the relationship parameters corresponding to the relationship between the plurality of causes of defect occurrence and the operation information may be changed.

More specifically, the model parameter of the neural network may be changed as the trained model (trained neural network) is retrained by using the operation information and the cause of defect occurrence determined by the service company.

Meanwhile, the processor 180 may store the updated training results in the memory 170. When other operation information is received, the processor 180 may acquire the cause of defect occurrence of the dishwasher by using the other operation information and the updated training results.

As described above, according to the present disclosure, there is an advantage that evolving artificial intelligence services may be provided by performing retraining by using the operation information already secured in the case of the prediction failure and the cause of defect occurrence accurately determined by the service company.

The dishwasher 200 according to one embodiment of the present disclosure will be described with reference to FIGS. 13 and 14.

Figure 13:
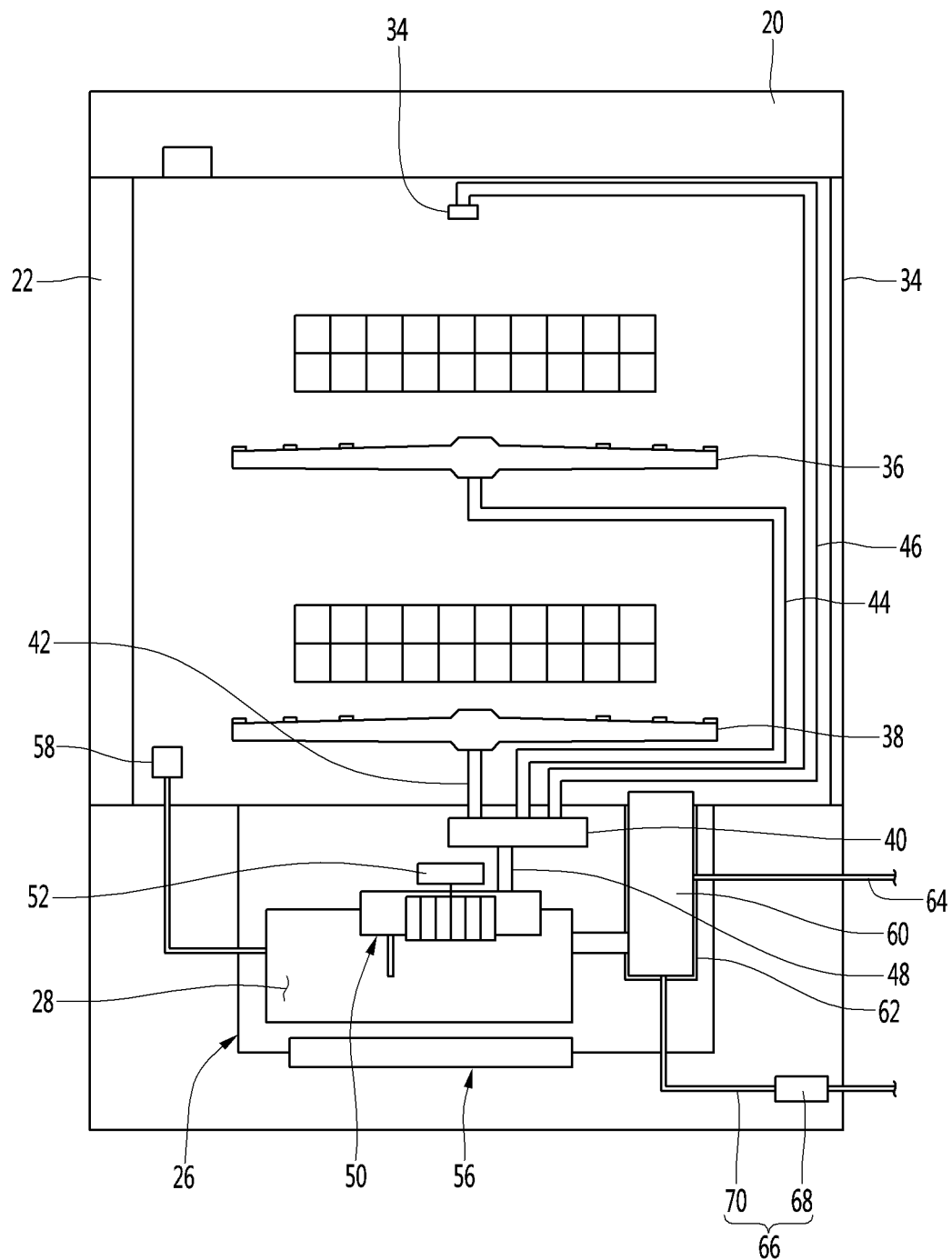
FIG. 13 is a schematic front cross-sectional view of a dishwasher according to one embodiment of the present disclosure.

FIG. 13 is a schematic front cross-sectional view of the dishwasher according to one embodiment of the present disclosure. FIG. 14 is a diagram for describing the flow of electric signals, water, detergent, and air inside the dishwasher according to one embodiment of the present disclosure.

Hereinafter, the configuration of the dishwasher according to the present embodiment and the flow of current and water therein will be described with reference to FIGS. 13 and 14.

Referring to FIG. 13, the dishwasher according to the embodiment of the present disclosure includes a cabinet 20 forming an appearance, a door 22 coupled to the cabinet 20 to open or close the inside of the cabinet 20, and a tub 24 installed inside the cabinet 20 to apply washing water or steam thereto.

The dishwasher according to the present embodiment may include a dispenser 72 for storing the detergent supplied by the user and supplying the detergent into the tub 24 in the cleaning operation. The dispenser 72 may be disposed on the door 22.

The tub 24 is a space in which dishes are placed for cleaning the dishes. The tub 24 according to the present embodiment may form an air guide hole 74 (see FIG. 14) on one side so as to discharge air to the outside to reduce the pressure when the internal pressure increases.

The dishwasher according to the present embodiment includes racks 30 and 32 for accommodating dishes in the tub 24, spray nozzles 34, 36, and 38 for spraying washing water toward the dishes accommodated in the racks 30 and 32, a sump 26 for supplying washing water to the spray nozzles 34, 36, and 38, a washing pump 50 for feeding the washing water stored in the sump 26 to the spray nozzles 34, 36, and 38, and supply pipes 42, 44, and 46 connecting the washing pump 50 and the spray nozzles 34, 36, and 38.

The dishwasher further includes a washing motor 52 for driving the washing pump 50. The washing motor 52 may be a brushless direct current (BLDC) motor capable of controlling the rotation speed. Since the cleaning motor 52 is a BLDC motor, it is possible to set a target revolution per minute (RPM). When the RPM of the BLDC motor is changed, the pressing force of the washing pump 50 changes.

Even when the RPM of the BLDC motor is the same, the amount of the washing water supplied to the sump may be different, or the current value may be changed according to the kind of fluid supplied to the sump. That is, even when the cleaning motor 52 rotates at the same RPM, the current value applied to the cleaning motor 52 may change according to whether the fluid supplied to the sump is water, air, or foam.

The dishwasher according to the present embodiment may further include a water supply module 60 for supplying water to the sump 26 or the spray module, a drainage module connected to the sump 26 to discharge the washing water to the outside, a filter assembly 70 provided in the sump 26 to filter the washing water, and a heater 56 provided in the sump 26 to heat the washing water.

The racks 30 and 32 are provided in the tub 24 to accommodate objects to be cleaned, such as dishes. In the present embodiment, the dishwasher includes at least one rack 30 and 32. The racks 30 and 32 according to the present embodiment include a lower rack 32 disposed at the lower portion inside the tub 24 and an upper rack 30 disposed above the lower rack 32.

The dishwasher according to the present embodiment includes at least one spray nozzle 34, 36, and 38. The dishwasher according to the present embodiment includes a lower nozzle 38 provided in the tub 24 to wash the object to be cleaned, which is accommodated in the lower rack 32, an upper nozzle 36 disposed to clean the object to be cleaned, which is accommodated in the upper rack 30, and a top nozzle 34 disposed at the uppermost portion of the tub 24 to spray washing water.

The supply pipes 42, 44, and 46 according to the present embodiment connect the sump 26 and the spray nozzles 34, 36, and 38. When the washing pump 50 is operated to pump the cleaning water stored in the sump 26, the washing water is supplied to the spray nozzles 34, 36, and 38. The supply pipes 42, 44, and 46 according to the present embodiment include a first pipe 42 for supplying washing water to the lower nozzle 38, a second pipe 44 for supplying washing water to the upper nozzle 36, and a third pipe 46 for supplying washing water to the top nozzle 34.

The dishwasher according to the present embodiment includes a flow path switching portion 40 for supplying the washing water stored in the sump 26 to the first to third pipes 42 to 46.

The flow path switching portion 40 according to the present embodiment may include a flow path switching motor (not illustrated) for generating a rotating force and a rotary plate (not illustrated) rotated by the flow path switching motor to adjust the flow of the washing water. The rotary plate according to the present embodiment may selectively open or close a plurality of connection ports (not illustrated) formed at a location where the plurality of supply pipes 42, 44, 46 are branched. A plurality of switching holes (not illustrated) may be formed in the rotary plate. The rotary plate is rotated stepwise by the flow path switching motor. When the rotary plate is rotated by the flow path switching motor, the plurality of switching holes formed in the rotary plate are located at positions corresponding to at least one of the plurality of connection ports so that the washing water flowing from the washing pump 50 is sprayed toward at least one of the plurality of spray nozzles 34.

The flow path switching motor according to the present embodiment generates a rotating force to rotate the rotary plate stepwise. The flow path switching motor is preferably a step motor that advances by a predetermined angle whenever an excitation state changes to an input pulse signal, and stops and maintains a predetermined position when the excitation state does not change.

The washing water discharged from the sump 26 through the washing pump 50 is transferred to the flow path switching portion 40 through a pump pipe 48. The flow path switching portion 40 may supply the washing water introduced from the sump to each of the first to third pipes 42 to 46 or at least two pipes thereof.

The upper nozzle 36 may be positioned below the upper rack 30. The upper nozzle 36 is preferably rotatably coupled to the second tube 44 so that the upper nozzle 36 is rotated by the repulsive force of the washing water when the washing water is sprayed.

The top nozzle 34 is disposed at a position higher than the upper rack 30. The top nozzle 34 is disposed on the upper side of the tub 24. The top nozzle 34 receives washing water from the third pipe 46 to spray the washing water into the upper rack 30 and the lower rack 32.

In the present embodiment, the spray nozzles 34, 36, and 38 are configured to receive the washing water from the sump 26 in which the washing water is stored, and spray the washing water. However, unlike the present embodiment, the spray nozzles 34, 36, and 38 are configured to directly receive water through the water supply module 60.

The water supply module 60 is configured to receive water from the outside to supply the water to the sump 26. The water supply module 65 opens or closes the water supply valve 65 to supply outside water into the sump 26. In the present embodiment, water is supplied to the sump 26 via the filter assembly 70. The drainage module is provided for discharging the washing water stored in the sump 26 to the outside, and includes a drainage flow path 64 and a drainage pump 66.

The filter assembly 70 is provided for filtering foreign matter such as food waste contained in the washing water, and is disposed on the flow path of the washing water introduced from the tub 24 into the sump 26.

To this end, the sump 26 may be provided with a filter mounting portion 62 on which the filter assembly 70 is installed, and a filter flow path connecting the filter mounting portion and the inside of the sump 26 may be disposed.

The sump 26 may include a steam nozzle 58 for spraying the steam generated by the heater 56 into the tub 24, and a valve (not illustrated) connected to the steam nozzle 58 through the steam path for interrupting steam may be installed in a steam flow path to interrupt the steam sprayed into the tub 24 through the valve. In some cases, the sump 26 may adjust the amount of steam.

The steam generated in the sump 26 may be supplied to the inside of the tub 24 through the filter flow path and the filter mounting portion 62, instead of the steam nozzle. The sump 26 may be connected to the tub 24 in both directions through the steam flow path and the filter flow path.

The dishwasher according to the present embodiment may include a water level detection unit for detecting the water level in the tub. The water level detection unit according to the present embodiment may include a water level detection sensor (not illustrated) into which a floater 76 (see FIG. 14) for detecting the water level in the tub 24 is mounted. The water level detection sensor detects the elevation height of the floater 76 and a floater 76 to detect the water level.

The electrical control of the internal configuration of the dishwasher, the flow of air inside the dishwasher, and the flow of water and foam are described with reference to FIG. 14.

The dishwasher according to the present embodiment is provided with a control panel (not illustrated) for allowing the user to select and control the function of the dishwasher. A control unit 78 including a circuit for operating the dishwasher and a printed circuit board (PCB) having various electric devices mounted thereon is provided inside the control panel.

The PCB is electrically connected to the configuration inside the dishwasher, and the control unit 78 may control the configuration inside the dishwasher through the PCB. The control unit 78 may supply the washing water into the tub 24 by opening or closing the water supply valve 65. The control unit 78 may operate the heater 56 to heat the washing water stored in the sump 26. The control unit 78 may operate the washing pump 50 to circulate the washing water stored in the sump 26 inside the tub 24. The control unit 78 controls the flow path switching portion 40 to supply the washing water supplied from the washing pump 50 to at least one of the spray nozzles. The control unit 78 may adjust the position of the rotary plate by driving the flow path switching motor. The control unit 78 may open or close the water supply valve 65 to supply water into the sump 26. The control unit 78 may operate the drainage pump 68 to drain the washing water in the tub 24. The control unit 78 may detect whether the door 22 is open or closed or may detect whether to open or close the door 22. The control unit 78 may open the dispenser 72 to introduce the detergent into the tub 24. The control unit 78 may detect the level of the water in the tub 24 by detecting the elevation height of the floater 76.

Figure 14:
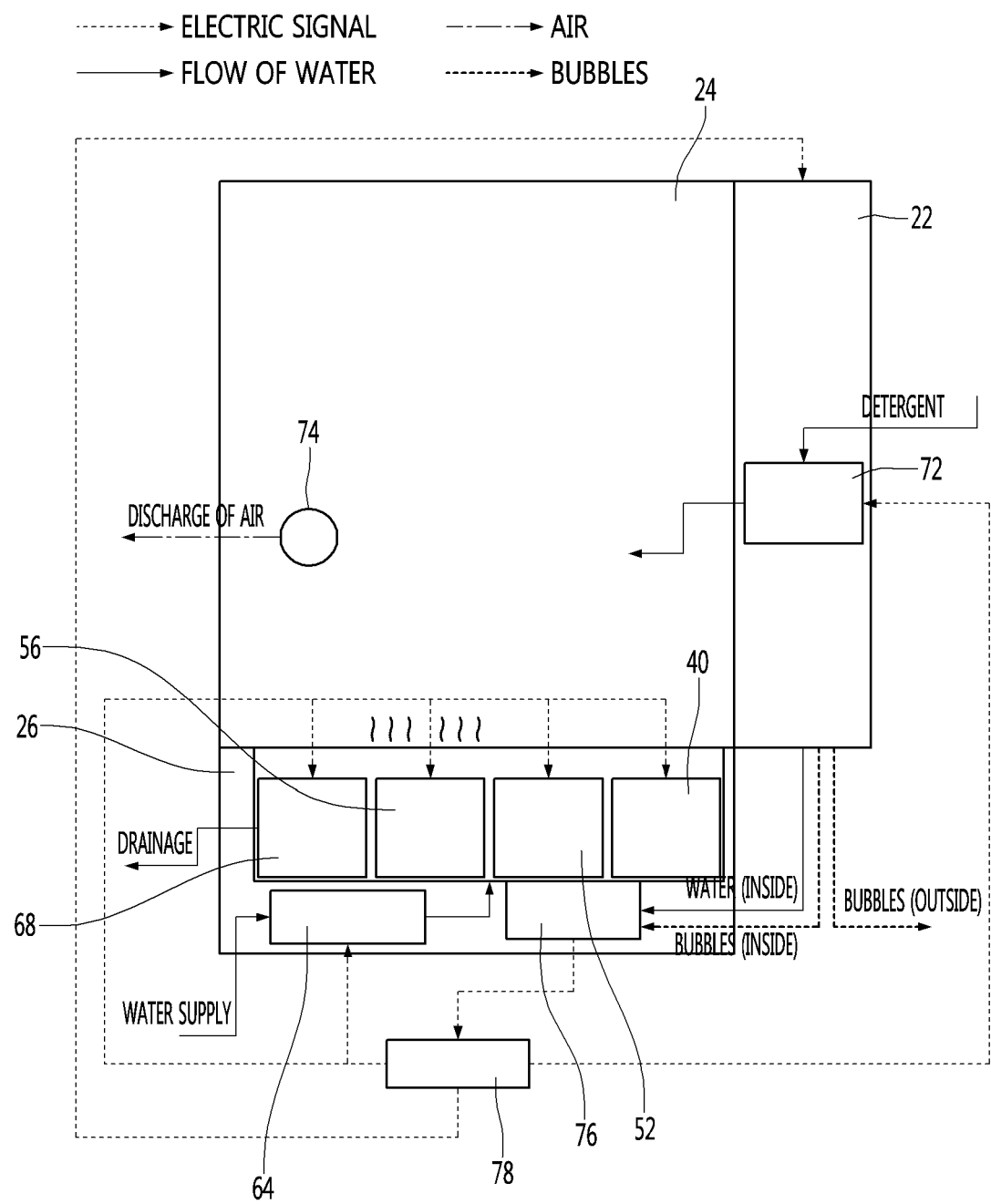
FIG. 14 is a diagram for describing the flow of electric signals, water, detergent, and air inside the dishwasher according to one embodiment of the present disclosure.

Referring to FIG. 14, the detergent may be introduced into the dispenser 72 by the user, and the detergent stored in the dispenser 72 may be introduced into the tub 24 during the washing process of the dishwasher and mixed with the washing water.

Referring to FIG. 14, when the water supply valve 65 is opened, washing water flows into the sump 26 from the outside. The washing water may be circulated in the tub 24 by the washing pump 50 and discharged outside the dishwasher by the operation of the drainage pump 68. The washing water circulating in the tub 24 passes through the water level detection unit, and the water level detection sensor or the floater 76 may detect whether the washing water exceeds the storage space inside the sump.

The washing water is a concept including water supplied from the outside, washing water mixed with detergent during washing, and rinse water used in the rinse process.

Referring to FIG. 14, when excessive bubbles are generated in the tub during the washing process, bubbles may leak through a gap between the tub and the door, and the air may flow through the air guide holes formed in the tub.

Figure 15:
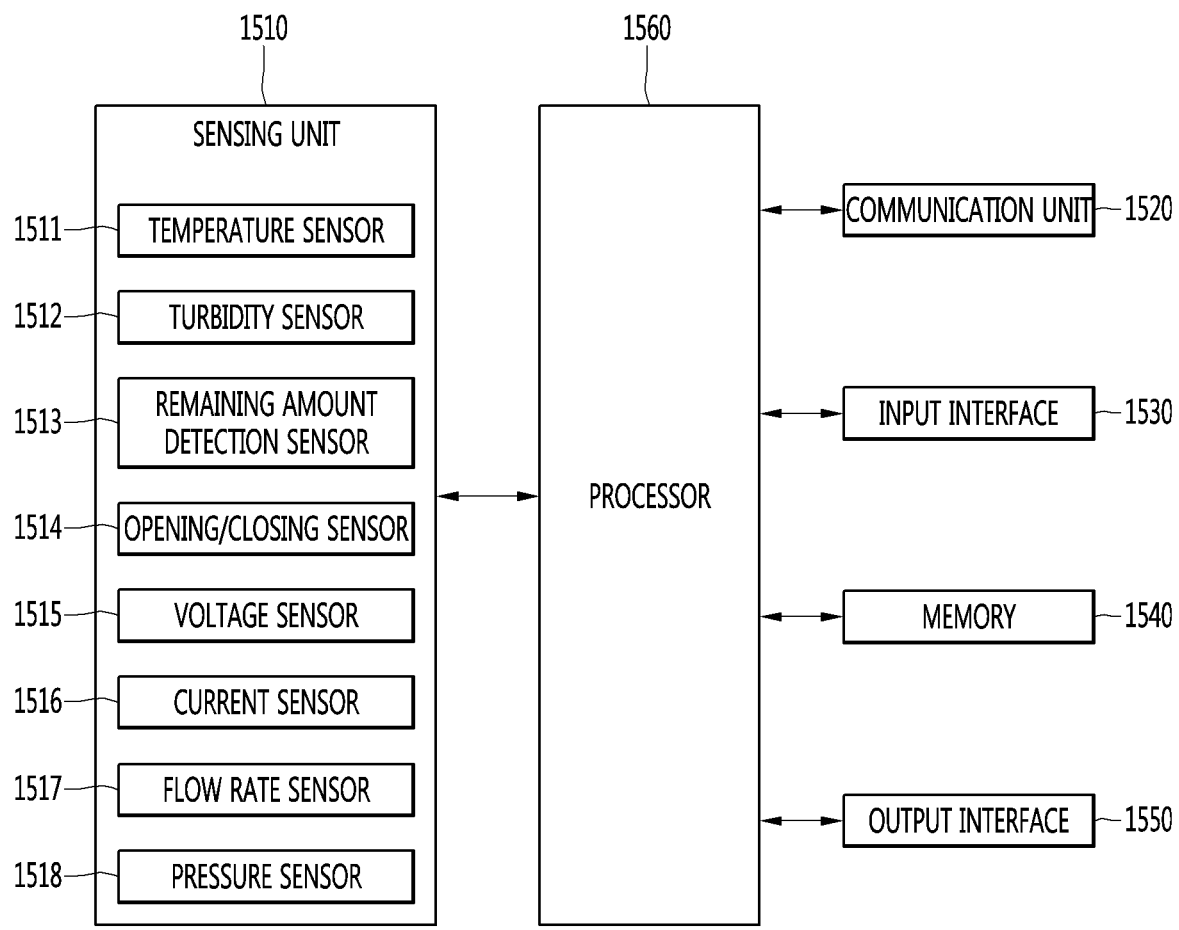
FIG. 15 is a block diagram for describing a dishwasher according to another embodiment of the present disclosure.

FIG. 15 is a block diagram for describing a dishwasher according to another embodiment of the present disclosure.

In the dishwasher 1500 according to FIG. 15, the configuration and function of the dishwasher described with reference to FIGS. 13 and 14 may be applied.

The dishwasher 1500 may include a sensing unit 1510, a communication unit 1520, an input interface 1530, a memory 1540, an output interface 1550, and a processor 1560.

The sensing unit 1510 may include at least one of a temperature sensor 1511, a turbidity sensor 1512, a remaining amount detection sensor 1513, an opening/closing sensor 1514, a voltage sensor 1515, a current sensor 1516, a flow rate sensor 1517, or a pressure sensor 1518.

The temperature sensor 1511 may include at least one temperature sensing module and may detect the temperature inside the dishwasher.

For example, the temperature sensor 1511 may detect temperatures of a tub, a water supply hose, a drainage hose, and the like.

The turbidity sensor 1512 may include one or more turbidity sensing modules and may detect the turbidity of the washing water.

The remaining amount detection sensor 1513 may include at least one remaining amount detection module and may detect the remaining amount of detergent, salt, and the like.

The opening/closing sensor 1514 may detect opening or closing of the door for opening or closing the inside of the cabinet.

The voltage sensor 1515 may include one or more voltage detection modules and may detect a low voltage at various locations within the dishwasher.

The current sensor 1516 includes one or more current sensing modules and is capable of sensing a low current at various locations within the dishwasher.

The flow rate sensor 1517 may include one or more flow rate detection modules and may detect the amount of supplied washing water and the amount of drained washing water at various locations within the dishwasher.

The pressure sensor 1518 may include at least one hydraulic pressure detection module and may detect the spray level of washing water, the pressure of supplied washing water, and the pressure of drained washing water at various locations within the dishwasher.

The communication unit 1520 may include a communication circuit for performing wired or wireless communication, and may perform wired or wireless communication with the server 100.

Meanwhile, the input interface 1530 may include a microphone for receiving an audio signal, and a user input unit for receiving information from a user.

The microphone processes the external acoustic signal as electrical voice data. The processed voice data may be utilized variously according to the function (or executed application program) performed in the dishwasher 1500.

The user input unit is provided for receiving information from a user. When information is input through the user input unit, the processor 1560 may control the operation of the dishwasher 1500 to correspond to the input information.

The user input unit may include a mechanical input means (or a mechanical key, e.g., a button located on the front/rear of the dishwasher 1500, a dome switch, a jog wheel, a jog switch, etc.) and a touch type input means. For example, the touch type input means may include a virtual key, a soft key, or a visual key displayed on the touch screen through software processing, or may include a touch key disposed at positions other than the touch panel.

In addition, the user input unit may include a touch sensor and may receive user input through the touch screen.

The memory 1540 may store data to support various functions of the dishwasher.

The output interface 1550 may include at least one of a display unit or an audio output unit and may output information.

The display unit displays (outputs) information processed in the dishwasher 1500. For example, the display unit may display execution screen information of an application program running on the dishwasher 1500, or user interface (UI) or graphic user interface (GUI) information according to the execution screen information.

The audio output unit may include at least one of a receiver, a speaker, or a buzzer and may output sound.

The processor 1560 may control the overall operation of the dishwasher.

Meanwhile, the processor 1560 may acquire operation information. The operation information may include at least one of sensing information, input information, generation information, or cycle information.

The sensing information is information sensed by the sensing unit 1510 and may include, for example, temperature, water pressure, opening or closing of the door, low voltage state, detergent deficiency, salt deficiency, and the like.

The input information is information received by the input interface, and may include power off, dry setting, energy saving setting, user setting course, and the like.

The generation information may be information generated by the processor 1560 based on at least one of the sensing information or the input information. For example, the processor 150 may generate information about turbidity at 10 seconds after the start of water supply by using turbidity sensed by the turbidity sensor, information indicating that the water supply has started, and a timer within the processor 150.

Meanwhile, the cycle information may include information about a cycle (washing, rinsing, drying) or a unit cycle (drainage, water supply, preliminary washing, main washing, heating washing, stop) in the dishwasher.

When the operation information is acquired, the processor 1560 may transmit the acquired operation information to the server 100.

In addition, when the cause of defect occurrence acquired by using the operation information is received from the server 100, the processor 1560 may control the output interface to output the cause of defect occurrence.

Further, when the cause of defect occurrence is associated with the user's erroneous operation, the processor 1560 may receive the usage method corresponding to the erroneous operation from the server through the communication unit. In this case, the processor 1560 may control the output interface to output the usage method corresponding to the erroneous operation.

The processor 1560 may also receive information about defect occurrence time or maintenance/repair information from the server. The information about the defect occurrence time or the maintenance/repair information may be acquired based on the progress degree of the cause of defect occurrence. The processor 1560 may control the output interface to output the information about the defect occurrence time or the maintenance/repair information.

Meanwhile, the processor 1560 may receive an input of a symptom generated in the dishwasher through the input interface. In this case, the processor 1560 may transmit the symptom generated in the dishwasher to the server. In addition, the processor 1560 may receive, from the server, the cause of defect occurrence acquired from the symptom generated in the dishwasher.

For example, when the acquired cause of defect occurrence corresponds to the symptom, the processor 180 of the server 100 may determine that the acquired cause of defect occurrence is right and transmit the acquired cause of defect occurrence to the dishwasher 200. As another example, the processor 180 of the server 100 may acquire the cause of defect occurrence of the dishwasher by using the output result of the trained neural network and the symptom generated in the dishwasher, and transmit the acquired cause of defect occurrence to the dishwasher 200.

Accordingly, the processor 1560 may receive, from the server, the cause of defect occurrence acquired by using the symptom generated in the dishwasher.

In the above embodiment, it is described that the server 100 acquires the cause of defect occurrence by using the training result.

However, the present disclosure is not limited thereto, and the acquisition of the cause of defect occurrence by using the training result may be performed in the dishwasher 1500.

Specifically, the trained model (trained neural network) may be mounted on the dishwasher 1500.

Meanwhile, the trained model 530 (trained neural network) may be implemented in hardware, software, or a combination of hardware and software. When all or part of the trained neural network 1030 is implemented in software, one or more instructions constituting the trained model may be stored in the memory 1540 of the dishwasher 1500.

And one or more instructions implementing the trained model are stored in the memory 1540, the training results acquired by using the training results constituting a part of the training model, that is, the plurality of defect occurrence and the operation information corresponding to each of the plurality of defect occurrence may be stored in the memory 1540.

The training results stored in the memory 1540 may include a relationship parameter corresponding to the relationship between the plurality of causes of defect occurrence and the operation information. In addition, the relationship parameter may mean the model parameter of the neural network (that is, the neural network mounted on the dishwasher 1500) trained by using the plurality of causes of defect occurrence and the operation information corresponding to each of the plurality of causes of defect occurrence.

In this case, the processor 1560 may acquire the cause of defect occurrence of the specific dishwasher by using the training result and operation information including at least one of sensing information sensed by the sensing unit, input information received by the input interface, generation information generated based on at least one of the sensing information or the input information, and cycle information, and may control the output interface to output the cause of defect occurrence.

Specifically, the processor 1560 may input the operation information of the specific dishwasher to the trained neural network to acquire the cause of defect occurrence of the specific dishwasher.

Meanwhile, the processor 1560 may transmit, to the server, the acquired cause of defect occurrence and the operation information corresponding to the acquired cause of defect occurrence.

When the acquired cause of defect occurrence is wrong, the processor 1560 may receive, from the server, the training result updated by using the acquired cause of defect occurrence and the operation information, and store the updated training result in the memory 1540.

Specifically, the processor 180 of the server 100 may store the operation information received from the dishwasher in the memory 170 and may transmit the cause of defect occurrence to the service company server 600.

When the cause of defect occurrence is wrong, the processor 180 may receive, from the service company server, the cause of defect occurrence determined by the service company.

In this case, the processor 180 of the server 100 may perform map training on the neural network by labeling the operation information stored in the memory 170 to the cause of defect occurrence determined by the service company.

In this manner, the processor 180 of the server 100 may update the trained model mounted on the server 100 by using the information received from the various dishwashers. In this case, the training result included in the trained model mounted on the server 100 may be updated. Specifically, the relationship parameters corresponding to the relationship between the plurality of causes of defect occurrence and the operation information may be changed.

Meanwhile, the processor 180 of the server 100 may transmit the updated trained model to the dishwasher 1500.

The processor 1560 of the dishwasher 1500 may receive, from the server, the updated trained model updated by using the acquired cause of defect occurrence and the operation information, and store the updated trained model in the memory 1540. Accordingly, the updated training result may be stored in the memory 1540.

The description of the operation and configuration of the server 100 may be equally applied to the dishwasher 1500 as long as it does not contradict the description of the dishwasher 1500.

The present disclosure may be embodied as computer-readable codes on a program-recorded medium. The computer-readable recording medium may be any recording medium that can store data which can be thereafter read by a computer system. Examples of the computer-readable medium may include a hard disk drive (HDD), a solid state disk (SSD), a silicon disk drive (SDD), a ROM, a RAM, a CD-ROM, a magnetic tape, a floppy disk, and an optical data storage device. The computer may also include the control unit 180 of the server. Therefore, the above description is illustrative and should not be construed as limited in all aspects. The scope of the present disclosure should be determined by rational interpretation of the appended claims, and all changes within the scope of equivalents of the present disclosure falls within the scope of the present disclosure.

What is claimed is:

1. A server comprising:
   a communicator configured to communicate with one or more dishwashers;
   a memory configured to store a training result acquired by using a plurality of causes of defect occurrence and operation information corresponding to each of the plurality of causes of defect occurrence; and
   a processor configured to:
   receive, from a specific dishwasher among the one or more dishwashers, operation information of the specific dishwasher;
   acquire a cause of defect occurrence of the specific dishwasher by using the operation information of the specific dishwasher and the training result;
   transmit, to a service company server, the acquired cause of defect occurrence of the specific dishwasher;
   receive, from the service company server, an evaluation of the acquired cause of defect occurrence of the specific dishwasher, the evaluation including evaluation information indicating whether the acquired cause of defect occurrence is wrong; and
   based on the evaluation information indicating that the acquired cause of defect occurrence is wrong, update a neural network by using a cause of defect occurrence received from the service company server and the operation information of the specific dishwasher,
   wherein the training result comprises a relationship parameter corresponding to a relationship between the plurality of causes of defect occurrence and the operation information corresponding to each of the plurality of causes of defect occurrence.

2. The server according to claim 1, wherein the relationship parameter is a model parameter of the neural network trained by using the plurality of causes of defect occurrence and the operation information corresponding to each of the plurality of causes of defect occurrence, and
   wherein the processor is further configured to input the operation information of the specific dishwasher to the trained neural network to acquire the cause of defect occurrence of the specific dishwasher.

3. The server according to claim 2, wherein the plurality of causes of defect occurrence are classified into a plurality of symptoms, and
   wherein the processor is further configured to:
   receive a symptom generated in the specific dishwasher from a user side device of the specific dishwasher; and
   acquire the cause of defect occurrence of the specific dishwasher by using an output result of the trained neural network and the received symptom.

4. The server according to claim 1, wherein when the cause of defect occurrence of the specific dishwasher is acquired, the processor is further configured to transmit the acquired cause of defect occurrence to a user side device of the specific dishwasher.

5. The server according to claim 1, wherein when the cause of defect occurrence of the specific dishwasher is associated with erroneous operation by a user, the processor is further configured to transmit a usage method corresponding to the erroneous operation to a user side device of the specific dishwasher.

6. The server according to claim 1, wherein the operation information corresponding to each of the plurality of causes of defect occurrence comprises operation information acquired by a dishwasher among the one or more dishwashers in correspondence to an occurrence degree of the cause of defect occurrence.

7. The server according to claim 6, wherein the processor is further configured to:
   acquire a progress degree of the cause of defect occurrence of the specific dishwasher by using the operation information of the specific dishwasher and the training result;
   acquire information about a defect occurrence time or maintenance/repair information based on the progress degree of the cause of defect occurrence; and
   transmit the information about the defect occurrence time or the maintenance/repair information to a user side device of the specific dishwasher.

8. The server according to claim 1, wherein the plurality of causes of defect occurrence are classified into a plurality of symptoms, and
   wherein the processor is further configured to:
   receive a symptom generated in the specific dishwasher; and
   based on the acquired cause of defect occurrence corresponding to the received symptom, determine that the acquired cause of defect occurrence is right and transmit the acquired cause of defect occurrence to a user side device of the specific dishwasher or the service company server.

9. A method for determining a cause of defect occurrence, the method comprising:
   storing, in a memory, a training result acquired by using a plurality of causes of defect occurrence and operation information corresponding to each of the plurality of causes of defect occurrence;
   receiving, from a specific dishwasher among one or more dishwashers, operation information of the specific dishwasher;
   acquiring a cause of defect occurrence of the specific dishwasher by using the operation information of the specific dishwasher and the training result;
   transmitting, to a service company server, the acquired cause of defect occurrence of the specific dishwasher;

receiving, from the service company server, an evaluation of the acquired cause of defect occurrence of the specific dishwasher, the evaluation including evaluation information indicating whether the acquired cause of defect occurrence is wrong; and based on the evaluation information indicating that the acquired cause of defect occurrence is wrong, updating a neural network by using a cause of defect occurrence received from the service company server and the operation information of the specific dishwasher, wherein the training result comprises a relationship parameter corresponding to a relationship between the plurality of causes of defect occurrence and the operation information corresponding to each of the plurality of causes of defect occurrence.

10. The method according to claim 9, wherein the relationship parameter is a model parameter of the neural network trained by using the plurality of causes of defect occurrence and the operation information corresponding to each of the plurality of causes of defect occurrence, and wherein the acquiring of the cause of defect occurrence of the specific dishwasher comprises inputting the operation information of the specific dishwasher to the trained neural network to acquire the cause of defect occurrence of the specific dishwasher.

11. The method according to claim 10, wherein the plurality of causes of defect occurrence are classified into a plurality of symptoms, and the acquiring of the cause of defect occurrence of the specific dishwasher comprises:

receiving a symptom generated in the specific dishwasher from a user side device of the specific dishwasher; and acquiring the cause of defect occurrence of the specific dishwasher by using an output result of the trained neural network and the received symptom.

12. The method according to claim 9, further comprising, when the cause of defect occurrence of the specific dishwasher is acquired, transmitting the acquired cause of defect occurrence to a user side device of the specific dishwasher.

13. The method according to claim 9, further comprising, based on the cause of defect occurrence of the specific dishwasher being associated with erroneous operation by a user, transmitting a usage method corresponding to the erroneous operation to a user side device of the specific dishwasher.

14. The method according to claim 9, wherein the operation information corresponding to each of the plurality of causes of defect occurrence comprises operation information acquired by a dishwasher among the one or more dishwashers in correspondence to an occurrence degree of the cause of defect occurrence.

15. The method according to claim 14, wherein the acquiring of the cause of defect occurrence of the specific dishwasher comprises:

acquiring a progress degree of the cause of defect occurrence of the specific dishwasher by using the operation information of the specific dishwasher and the training result;

acquiring information about a defect occurrence time or maintenance/repair information based on the progress degree of the cause of defect occurrence; and transmitting the information about the defect occurrence time or the maintenance/repair information to a user side device of the specific dishwasher.

16. The method according to claim 9, wherein the plurality of causes of defect occurrence are classified into a plurality of symptoms, and wherein the method further comprises:

receiving a symptom generated in the specific dishwasher; and based on the acquired cause of defect occurrence corresponding to the received symptom, determining that the acquired cause of defect occurrence is right and transmitting the acquired cause of defect occurrence to a user side device of the specific dishwasher or the service company server.

17. A dishwasher comprising:

a sensor comprising at least one of a temperature sensor configured to sense a temperature inside the dishwasher, a turbidity sensor configured to sense turbidity of washing water, a remaining amount detection sensor configured to sense a remaining amount of salt or detergent, an opening/closing sensor configured to sense opening/closing of a door, a voltage sensor configured to sense a low voltage, a current sensor configured to sense a low current, a flow sensor configured to sense an amount of supplied/drained washing water, or a pressure sensor configured to sense a spray level of washing water or a pressure of supplied/drained washing water;

an input interface configured to receive an input from a user;

a communicator configured to communicate with a server;

an output interface configured to output information;

a memory configured to store a training result acquired by using a plurality of causes of defect occurrence and operation information corresponding to each of the plurality of causes of defect occurrence; and a processor configured to:

control the sensor, the memory, the input interface, the communicator, and the output interface;

acquire a cause of defect occurrence of the dishwasher by using the training result and operation information of the dishwasher comprising at least one of sensing information sensed by the sensor, input information received by the input interface, generation information generated based on at least one of the sensing information or the input information, or cycle information;

control the output interface to output the acquired cause of defect occurrence of the dishwasher;

transmit, to a service company server, the acquired cause of defect occurrence of the dishwasher and the operation information of the dishwasher;

based on the service company server providing information indicating that the acquired cause of defect occurrence is wrong, receiving an updated training result acquired by using a cause of defect occurrence provided by the service company server and the operation information of the dishwasher, wherein the training result comprises a relationship parameter corresponding to a relationship between the plurality of causes of defect occurrence and the operation information corresponding to each of the plurality of causes of defect occurrence.

18. The dishwasher according to claim 17, wherein the processor is further configured to:

store the updated training result in the memory.

* * * * *